(12) United States Patent
Urushihara et al.

(10) Patent No.: US 8,288,462 B2
(45) Date of Patent: Oct. 16, 2012

(54) POLYOLEFIN RESIN COMPOSITION

(75) Inventors: Tsuyoshi Urushihara, Saitama (JP);
Kazukiyo Nomura, Saitama (JP); Naoto Ueda, Saitama (JP); Yota Tsuneizumi, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/061,012

(22) PCT Filed: Aug. 21, 2009

(86) PCT No.: PCT/JP2009/064620
§ 371 (c)(1),
(2), (4) Date: Feb. 25, 2011

(87) PCT Pub. No.: WO2010/024191
PCT Pub. Date: Mar. 4, 2010

(65) Prior Publication Data
US 2011/0218279 A1 Sep. 8, 2011

(30) Foreign Application Priority Data

Aug. 28, 2008 (JP) ............... 2008-219829
Sep. 24, 2008 (JP) ............... 2008-243583
Mar. 27, 2009 (JP) ............... 2009-080565
Apr. 6, 2009 (JP) ............... 2009-092301
Apr. 10, 2009 (JP) ............... 2009-096510

(51) Int. Cl.
*C08K 5/22* (2006.01)
*C08K 5/52* (2006.01)
(52) U.S. Cl. ................... 524/189; 524/141
(58) Field of Classification Search ............ 524/189
See application file for complete search history.

(56) References Cited

U.S. PATENT DOCUMENTS

| | | | |
|---|---|---|---|
| 3,553,254 A | 1/1971 | Tesoro et al. | |
| 4,463,113 A | 7/1984 | Nakahara et al. | |
| 5,342,868 A | 8/1994 | Kimura et al. | |
| 6,235,823 B1 | 5/2001 | Ikeda et al. | |
| 7,442,735 B2 * | 10/2008 | Tobita et al. | 524/108 |

FOREIGN PATENT DOCUMENTS

| | | |
|---|---|---|
| JP | 50-105558 | 8/1975 |
| JP | 51-114482 | 10/1976 |
| JP | 58-1736 A | 1/1983 |
| JP | 59-184252 A | 10/1984 |

(Continued)

OTHER PUBLICATIONS

Translation of JP 06-220269, Aug. 1994.*

(Continued)

Primary Examiner — Hui Chin

(74) *Attorney, Agent, or Firm* — Birch, Stewart, Kolasch & Birch, LLP

(57) ABSTRACT

The present invention provides a polyolefin-based resin composition containing a crystal nucleating agent having a specific structure, which polyolefin-based resin composition has a superior transparency and whose crystallization is facilitated. The polyolefin-based resin composition is characterized by comprising, with respect to 100 parts by mass of a polyolefin-based resin, 0.01 to 1 parts by mass of at least one crystal nucleating agent selected from the group consisting of crystal nucleating agents each having a structure represented by one of the following Formulas (1) to (6):

Formula (1):

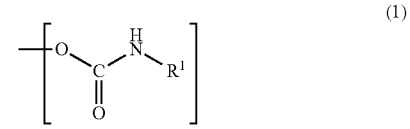

Formula (2):

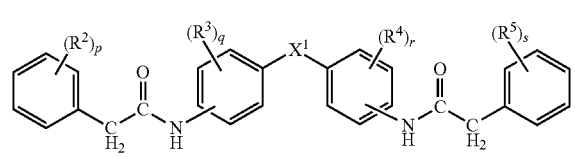

Formula (3):

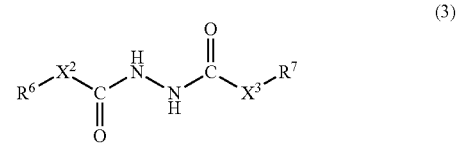

Formula (4):

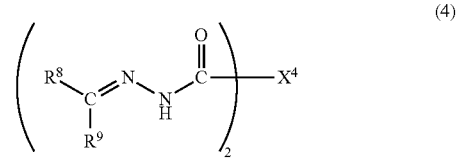

Formula (5):

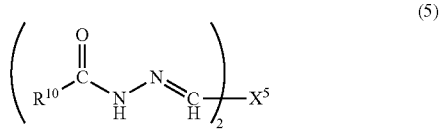

Formula (6):

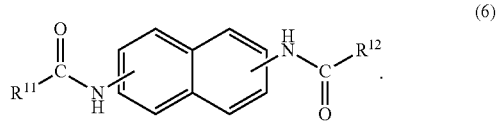

10 Claims, No Drawings

FOREIGN PATENT DOCUMENTS

| | | |
|---|---|---|
| JP | 63-69853 A | 3/1988 |
| JP | 1-104638 A | 4/1989 |
| JP | 1-104639 A | 4/1989 |
| JP | 1-104647 A | 4/1989 |
| JP | 1-129050 A | 5/1989 |
| JP | 1-129051 A | 5/1989 |
| JP | 3-43437 A | 2/1991 |
| JP | 3-79649 A | 4/1991 |
| JP | 3-81638 A | 4/1991 |
| JP | 5-156078 A | 6/1993 |
| JP | 5-310665 A | 11/1993 |
| JP | 6-107875 A | 4/1994 |
| JP | 6-220269 A | 8/1994 |
| JP | 6-240058 A | 8/1994 |
| JP | 06220269 A * | 8/1994 |
| JP | 6-271762 A | 9/1994 |
| JP | 8-157640 A | 6/1996 |
| JP | 2000-319463 A | 11/2000 |
| JP | 2003-514053 A | 4/2003 |
| JP | 2004-323742 A | 11/2004 |
| JP | 2004-352873 A | 12/2004 |
| JP | 2007-70574 A | 3/2007 |
| JP | 2008-69245 A | 3/2008 |
| WO | WO 01/32763 A1 | 5/2001 |
| WO | WO 02/24797 A1 | 3/2002 |
| WO | 2004-510002 A | 4/2004 |

OTHER PUBLICATIONS

Yoshikawa et al., Materials Life, 11 [4], 183-186, 1999.*
International Search Report dated Dec. 1, 2009 for International Application No. PCT/JP2009/064620.
Yoshikawa et al., "Diacylhydrazine-rui no Kakuzai Sayo no Netsu Anteisei ni Kansuru Kenkyu (Heat Stability of Crystal Nucleating Activity of Diacylhydrazines)", Materials Life, vol. 11, No. 4, Oct. 30, 1999, pp. 183-186.
Chinese Office Office dated Jul. 4, 2012 in corresponding Chinese Patent Application No. 200980133915.7.

* cited by examiner

POLYOLEFIN RESIN COMPOSITION

TECHNICAL FIELD

The present invention relates to a polyolefin-based resin composition. Particularly, the present invention relates to a polyolefin-based resin composition containing a specific crystal nucleating agent.

BACKGROUND ART

Polyolefin-based resins have advantages in their superior moldability, heat-resistance, mechanical characteristics, low specific gravity and the like; therefore, they are widely used in films, sheets and a variety of molded articles (such as structural parts). However, although the polyolefin-based resins per se generally have superior physical properties, there are cases where the use of a polyolefin-based resin is restricted depending on a certain type of application since the intrinsic superior performance of the resin cannot be attained.

This defect arises from the crystallizability of the polyolefin-based resins. In order to improve the crystallizability of a polyolefin-based resin to better the resin transparency and also to provide heat-resistance and mechanical strength, a variety of crystal nucleating agents are widely used. In addition, it is known that the crystallization of a polyolefin-based resin during molding is made controllable by adding a certain compound or composition to the polyolefin-based resin. In general, a polyolefin-based resin whose crystallizing action is facilitated may attain advantages in, for example, that the molding cycle time is shortened, that the transparency of the molded articles of the polyolefin-based resin is improved, and that the heat-resistance and physical characteristics are improved. Examples of such crystal nucleating agent include metal carboxylates such as sodium benzoate, aluminum 4-tert-butyl benzoate, sodium adipate, disodium-bicyclo[2.2.1]heptane-2,3-dicarboxylate; phosphoric ester metal salts such as sodium-bis(4-tert-butylphenyl)phosphate, sodium-2,2'-methylenebis(4,6-di-tert-butylphenyl)phosphate and lithium-2,2'-methylenebis(4,6-di-tert-butylphenyl)phosphate; and polyalcohol derivatives such as dibenzylidene sorbitol, bis(methylbenzylidene)sorbitol and bis(dimethylbenzylidene)sorbitol.

Further, it is also widely known to add an amide compound in order to improve the properties of a polyolefin-based resin. For example, Patent Document 1 proposes to blend a fatty acid diamide compound of phenylenediamine in order to inhibit deterioration of polypropylene which comes into contact with a heavy metal such as copper, and demonstrates the deterioration-inhibiting effect of the heavy metal. Further, Patent Document 2 discloses that the heat-sealing property and transparency are improved by blending a bis-amide compound to a polyolefin polymer containing polybutene-1 at an amount not less than 5% by mass. Furthermore, in Patent Document 3, it is disclosed that a crystalline polypropylene-based resin composition containing a large amount of β-crystal is obtained by adding an amide compound obtained from diamine and monocarboxylic acid to polypropylene. Still further, proposed in Patent Document 4 is a compound obtained by allowing naphthalene dicarboxylic acid or biphenyl dicarboxylic acid to react with monoamine. Still further, Patent Document 5 discloses a polypropylene resin composition whose crystallization temperature is improved by adding two or more urea-based compounds selected from monourea derivatives and diurea derivatives.

Still further, it is also known to use a hydrazide compound in order to improve the transparency of a polyolefin-based resin and to provide heat-resistance and mechanical strength. As an example of such resin using a hydrazide compound, Patent Document 6 describes a polylactic acid-based resin in which a hydrazide compound whose structure have phenol is used as a crystal nucleating agent. In addition, in Patent Document 7, it is described that the crystallization temperature of a polylactic acid-based resin composition is improved by blending to the polylactic acid an amide compound selected from chain amide, cyclic amid, chain hydrazide and cyclic hydrazide. In Patent Document 8, it is proposed to use, in a polylactic acid-based resin, a plasticizer constituted by an aliphatic ester derivative or aliphatic polyether derivative and a hydrazide compound such as octanedicarboxylic acid dibenzoyl hydrazide as the organic crystal nucleating agent in combination. Further, Patent Document 9 proposes to use a hydrazide compound in order to inhibit the release of aldehyde from the polypropylene material which was made transparent by dibenzyliden sorbitol. Still further, described in Patent Document 10 is to utilize a hydrazide compound such as N,N'-bis[3-(3,5-di-t-butyl-4-hydroxyphenyl)propionyl] hydrazine as the heavy metal inactivator in a crystalline polypropylene resin composition.

In addition, as a method of improving the crystallizability of a polyolefin-based resin, it is also known to use a hydrazone compound. As an example of such resin using a hydrazone compound, Patent Document 11 describes a polyacetal resin composition in which a hydrazone compound is used. Patent Document 11 describes the effects of inhibiting the generation of formaldehyde originated from the polyacetal resin and preventing mold deposit and bleed out. Further, in addition to the aforementioned Patent Document 11, compounds having a hydrazone structure are known to be used as a photopolymerization initiator or as raw material of polyurethane.

However, in the Patent Document 11, there is no description at all regarding the effects of the hydrazone compound to facilitate resin crystallization. In addition, conventionally, there is no known case where a hydrazone compound is applied to a polyolefin-based resin.

Incidentally, crystalline synthetic resins such as polyethylene, polypropylene, polybutene-1, polyethylene terephthalate, polybutylene terephthalate, polyphenylene sulfide and polyamide have problems in that the mold cycles are delayed due to the slow crystallization rate after heat-melt molding and that resin contraction may occur due to the further progress of crystallization after heat molding. In addition, these crystalline synthetic resins have defects in that, because of the generation of large crystals, the strength is not sufficient and the transparency is poor.

These defects also arise from the crystallizability of the synthetic resins, and it is known that these defects are overcome if the crystallization temperature of the synthetic resin could be improved, thereby allowing fine crystals to promptly form.

In order to solve the aforementioned defects, it is known to add a crystal nucleating agent or a crystallization promoter to the resin, and conventionally, carboxylic acid metal salts such as aluminum 4-tert-butyl benzoate and sodium adipate; acidic phosphoric ester metal salts such as sodium-bis(4-tert-butylphenyl)phosphate and sodium-2,2'-methylenebis(4,6-di-tert-butylphenyl)phosphate; and polyalcohol derivatives such as dibenzylidene sorbitol and bis(4-methylbenzylidene)sorbitol have been used.

Among those compounds, cyclic phosphoric acid ester metal salts of alkylidene bisphenols described in Patent Documents 12 and 13 have prominent effects and are, therefore, widely used.

In addition, by using these compounds in combination with other metal compound(s), it has been attempted to improve the effects of a resin. For example, Patent Document 14 discloses a method in which, in order to prevent a decrease in the resin rigidity when an aromatic phosphoric acid alkali metal salt-based nucleating agent and a carboxylic acid alkaline-earth metal salt such as calcium stearate are used in combination, a hydrotalcites or a carboxylic acid alkali metal salt is used in place of the carboxylic acid alkaline-earth metal salt.

In addition, Patent Documents 15 and 16 disclose a method in which a cyclic organic phosphoric acid ester metal salt and a metal salt (the metal belonging to the Periodic Table Group II) of aliphatic carboxylic acid are used in combination, and Patent Documents 17 and 18 disclose a method in which an acidic organic phosphate compound and an aliphatic carboxylic acid metal salt are used in combination. Disclosed in Patent Document 19 is a method in which, when a cyclic organic phosphoric acid ester metal salt is used, in order to prevent a decrease in the pH during the immersion into hot water after carrying out radiation irradiation as a post-treatment, a hydroxide of alkali metal, alkaline-earth metal or aluminum-group metal is used in combination. Patent Documents 20 to 22 disclose a method in which a basic aluminum salt of aromatic phosphodiester is used to improve the processability and heat-resistant rigidity of highly rigid propylene-based resins. Disclosed in Patent Document 23 is a method in which a basic aluminum salt of aromatic phosphodiester and a carboxylic acid alkali metal salt are used in combination, and Patent Documents 24 and 25 disclose a method in which a polyamine-based amide compound is blended to a crystalline synthetic resin such as polyolefin resin.

RELATED ART DOCUMENTS

Patent Document

Patent Document 1: Japanese Unexamined Patent Application Publication No. S50-105558
Patent Document 2: Japanese Unexamined Patent Application Publication No. S51-114482
Patent Document 3: Japanese Unexamined Patent Application Publication No. H6-107875
Patent Document 4: Japanese Unexamined Patent Application Publication No. H5-310665
Patent Document 5: Japanese Unexamined Patent Application Publication No. H6-240058
Patent Document 6: Japanese Unexamined Patent Application Publication No. 2004-323742
Patent Document 7: Japanese Unexamined Patent Application Publication No. 2004-352873
Patent Document 8: Japanese Unexamined Patent Application Publication No. 2008-69245
Patent Document 9: Japanese Unexamined Patent Application Publication (Translation of PCT Application) No. 2004-510002
Patent Document 10: Japanese Unexamined Patent Application Publication No. 2000-319463
Patent Document 11 Japanese Unexamined Patent Application Publication No. 2007-70574
Patent Document 12: Japanese Unexamined Patent Application Publication No. S58-1736
Patent Document 13: Japanese Unexamined Patent Application Publication No. S59-184252
Patent Document 14: Japanese Unexamined Patent Application Publication No. S63-69853
Patent Document 15: Japanese Unexamined Patent Application Publication No. H1-129050
Patent Document 16: Japanese Unexamined Patent Application Publication No. H1-129051
Patent Document 17: Japanese Unexamined Patent Application Publication No. H3-79649
Patent Document 18: Japanese Unexamined Patent Application Publication No. H3-81368
Patent Document 19: Japanese Unexamined Patent Application Publication No. H3-43437
Patent Document 20: Japanese Unexamined Patent Application Publication No. H1-104638
Patent Document 21: Japanese Unexamined Patent Application Publication No. H1-104639
Patent Document 22: Japanese Unexamined Patent Application Publication No. H1-104647
Patent Document 23: Japanese Unexamined Patent Application Publication No. H5-156078
Patent Document 24: Japanese Unexamined Patent Application Publication No. H6-271762
Patent Document 25: Japanese Unexamined Patent Application Publication No. H8-157640

SUMMARY OF THE INVENTION

Problems to be Solved by the Invention

As discussed in the above, a variety of crystal nucleating agents have been examined heretobefore; however, in recent years, since even higher level of performance is desired in polyolefin-based resins, specifically in polypropylene resins, a crystal nucleating agent capable of further improving the transparency and providing other characteristics is demanded. Thus, those crystal nucleating agents that have been proposed heretobefore are not considered sufficient; therefore, a further development of crystal nucleating agent is desired.

For example, the fatty acid diamide compound of phenylene diamine described in Patent Document 1 is not practical for polypropylene resins since its effect as crystal nucleating agent is limited. In addition, the bisamide compound described in Patent Document 2 (N,N'-dioctadecyl-nonanediamide indicated as Samples No. 3-5 and No. 3-6, which are listed in Table 3 in page 7 of the specification) by itself does not exhibit transparency improving effect for polypropylene; therefore, it is required to blend polybutene-1. Furthermore, the amide compound obtained from diamine and monocarboxylic acid, which is described in Patent Document 3, is a β-crystal nucleating agent; however, in polypropylene-based resin compositions, since β-crystal have a lower melting point than α-crystal and the resulting molded article consequently has a poor transparency, the amide compound is not suitable for providing a polypropylene having both heat-resistance and transparency. Moreover, the compound obtained by allowing naphthalene dicarboxylic acid or biphenyl dicarboxylic acid to react with monoamine, which is described in Patent Document 4, had a limited transparency improving effect when actually evaluated; thus, it is not satisfactory. Those polyolefin-based resins described in other Patent Documents are not satisfactory in their transparency or the like; therefore, a further improvement has been demanded.

In view of the above, an object of the present invention is to provide a polyolefin-based resin composition having superior transparency. Further, another object of the present invention is to provide a polyolefin-based resin composition whose crystallization is facilitated, by using a crystal nucleating agent having a novel structure which is totally different from conventional crystal nucleating agents.

Means for Solving the Problems

In order to solve the above-described problems, the present inventors intensively studied to discover that the above-described objects can be achieved by using a crystal nucleating agent having a specific structure, thereby completing the present invention.

That is, the polyolefin-based resin composition according to the present invention is characterized in that it comprises, with respect to 100 parts by mass of a polyolefin-based resin, 0.01 to 1 parts by mass of at least one crystal nucleating agent selected from the group consisting of:

a crystal nucleating agent (A) having a structure in which at least 4 carbamate groups represented by the following Formula (1) are linked via $C_1$-$C_{10}$ hydrocarbon group:

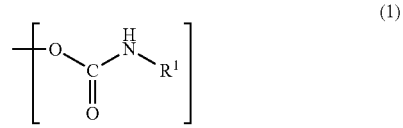

(wherein, $R^1$ represents a hydrogen atom, a $C_1$-$C_{12}$ alkyl group which is optionally branched, a $C_3$-$C_{12}$ cycloalkyl group which is optionally substituted or a $C_6$-$C_{18}$ aryl group which is optionally substituted; and the plural $R^1$s are each optionally different);

a crystal nucleating agent (B) represented by the following Formula (2):

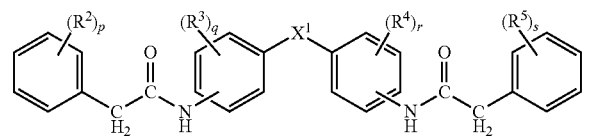

(wherein, $X^1$ is a $C_1$-$C_5$ alkylene group which is optionally branched; $R^2$ to $R^5$ independently represent one selected from the group consisting of a halogen atom, a $C_1$-$C_4$ alkyl group which is optionally substituted and/or is optionally branched and a $C_1$-$C_4$ alkoxy group which is optionally substituted and/or is optionally branched; and p, q, r and s independently represent an integer of 0 to 3 (provided that p and s are not 0));

a crystal nucleating agent (C) represented by the following Formula (3):

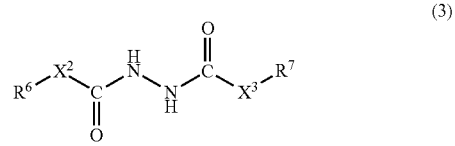

(wherein, $R^6$ and $R^7$ independently represent a $C_1$-$C_{10}$ alkyl group which is optionally branched and/or is optionally substituted, a $C_3$-$C_{12}$ cycloalkyl group which is optionally substituted or a $C_6$-$C_{20}$ aryl group which is optionally substituted; and $X^2$ and $X^3$ independently represent a single bond or a $C_1$-$C_5$ alkylene group; provided that the substituent(s) is/are not a hydroxyl group);

a crystal nucleating agent (D) represented by the following Formula (4):

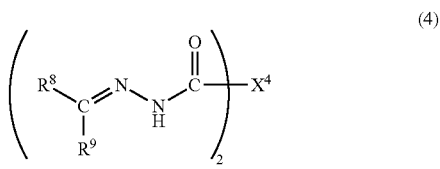

(wherein, $R^8$ and $R^9$ independently represent a hydrogen atom, a $C_1$-$C_{12}$ alkyl group which is optionally branched and/or is optionally substituted, a $C_3$-$C_{12}$ cycloalkyl group which is optionally substituted or a $C_6$-$C_{18}$ aryl group which is optionally substituted; $R^8$ and $R^9$ optionally form a $C_6$-$C_{18}$ ring with a carbon atom at a terminal of the hydrazone structure; and $X^4$ represents a $C_1$-$C_{10}$ alkylene group which is optionally branched and/or is optionally substituted, a $C_3$-$C_{12}$ cycloalkylene group which is optionally substituted or a $C_6$-$C_{20}$ arylene group which is optionally substituted);

a crystal nucleating agent (E) represented by the following Formula (5):

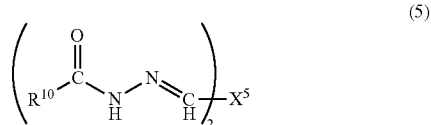

(wherein, $R^{10}$ represents a hydrogen atom, a $C_1$-$C_{12}$ alkyl group which is optionally branched and/or is optionally substituted, a $C_3$-$C_{12}$ cycloalkyl group which is optionally substituted or a $C_6$-$C_{18}$ aryl group which is optionally substituted; and $X^5$ represents a $C_1$-$C_{10}$ alkylene group which is optionally branched and/or is optionally substituted, a $C_3$-$C_{12}$ cycloalkylene group which is optionally substituted or a $C_6$-$C_{20}$ arylene group which is optionally substituted); and a crystal nucleating agent (F) represented by the following Formula (6):

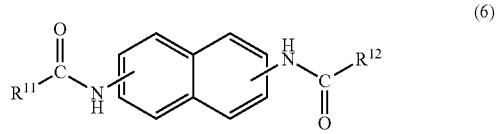

(wherein, $R^{11}$ and $R^{12}$ independently represent a $C_1$-$C_6$ alkyl group which is optionally branched).

Further, in the present invention, it is preferred that the crystal nucleating agent (A) having a structure in which at least 4 carbamate groups represented by the above Formula (1) are linked via a $C_1$-$C_{10}$ hydrocarbon group be one which is represented by the following Formula (7):

(7)

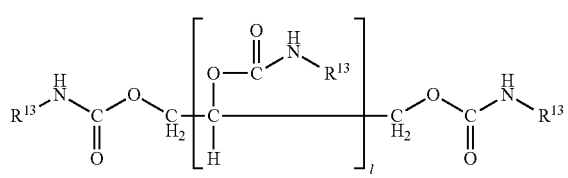

(wherein, $R^{13}$ has the same definition as $R^1$ in the above Formula (1); l represents an integer of 2 to 10; and the plural $R^{13}$s are each optionally different); or one which is represented by the following Formula (8):

(8)

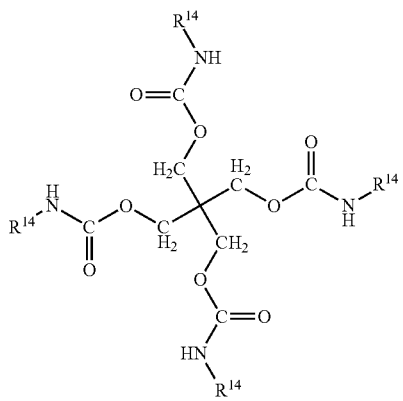

(wherein, $R^{14}$ has the same definition as $R^1$ in the above Formula (1); and the plural $R^{14}$s are each optionally different).

Further, in the present invention, it is more preferred, in the above Formula (2) representing the aforementioned crystal nucleating agent (B), that the $R^2$ and $R^5$ be at an ortho position of the benzene ring and/or that the p and s represent 1 and q and r are 2.

Still further, in the present invention, it is preferred that the crystal nucleating agent (C) represented by the above Formula (3) be at least one selected from the group consisting of crystal nucleating agents represented by the following Formulae (9) to (11):

(9)

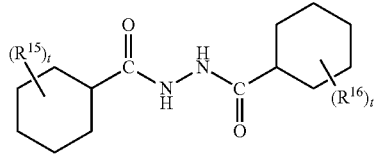

(10)

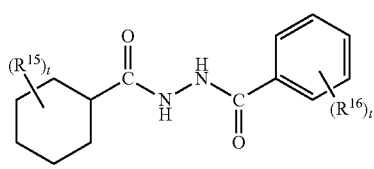

(11)

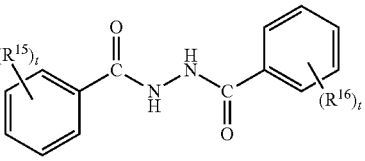

(wherein, $R^{15}$ and $R^{16}$ independently have the same definition as the $R^6$ in the above Formula (3); and t represents 0 or 1).

Further, in the present invention, it is preferred that the $X^4$ in the above Formula (4) representing the aforementioned crystal nucleating agent (D) be a 1,4-cyclohexylene group or that the $X^5$ in the above Formula (5) representing the aforementioned crystal nucleating agent (E) be a 1,4-phenylene group.

Further, in the present invention, it is preferred that the crystal nucleating agent (F) represented by the above Formula (6) be selected from the group consisting of crystal nucleating agents represented by the following Formulae (12) and (13):

(12)

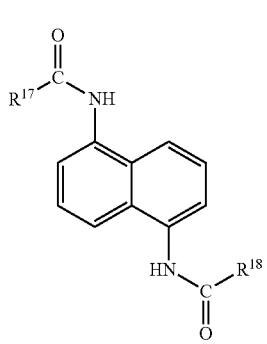

(13)

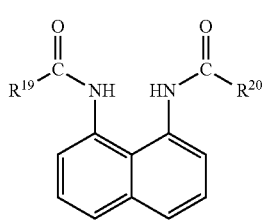

(wherein, $R^{17}$, $R^{18}$, $R^{19}$ and $R^{20}$ independently represent a $C_1$-$C_{12}$ alkyl group which is optionally branched).

Still further, it is preferred that the crystal nucleating agent according to the present invention further comprise, with respect to 100 parts by mass of the polyolefin-based resin, one or more selected from the group consisting of:

0.001 to 5 parts by mass of cyclic organic phosphoric acid ester metal salt compound represented by the following Formula (14):

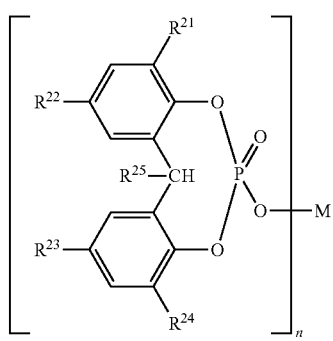

(14)

(wherein, $R^{21}$ to $R^{24}$ independently represent a hydrogen atom or a $C_1$-$C_9$ alkyl group which is optionally branched; $R^{25}$ represents a hydrogen atom or a methyl group; n represents 1 or 2; M represents an alkali metal when n is 1; and when n is 2, M represents Al(OH));

0.001 to 5 parts by mass of carboxylic acid alkali metal salt; and 0.001 to 5 parts by mass of diamide compound represented by the following Formula (15):

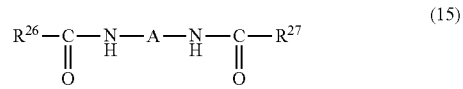

(15)

[wherein, $R^{26}$ and $R^{27}$ independently represent a hydrogen atom, a $C_1$-$C_{21}$ alkyl group which is optionally branched and/or is optionally substituted, a $C_3$-$C_{12}$ cycloalkyl group which is optionally substituted, a $C_6$-$C_{20}$ aryl group which is optionally substituted or a $C_6$-$C_{20}$ arylalkyl group which is optionally branched and/or is optionally substituted; and A represents a group represented by the following Formula (16):

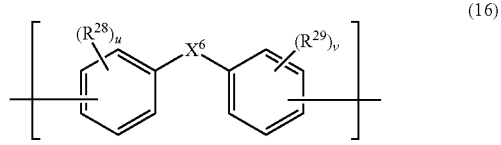

(16)

(wherein, $X^6$ represents a $C_1$-$C_5$ alkylene group which is optionally branched; $R^{28}$ and $R^{29}$ independently represent a halogen atom, a $C_1$-$C_4$ alkyl group which is optionally branched and/or is optionally substituted or a $C_1$-$C_4$ alkoxy group which is optionally branched and/or is optionally substituted; and u and v independently represent an integer of 0 to 4) or a group represented by the following Formula (17):

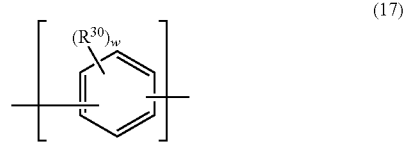

(17)

(wherein, $R^{30}$ represents a halogen atom, a $C_1$-$C_4$ alkyl group which is optionally branched and/or is optionally sub-stituted or a $C_1$-$C_4$ alkoxy group which is optionally branched and/or is optionally substituted; and w represents an integer of 0 to 4)].

Further, in the crystal nucleating agent according to the present invention, it is preferred that, in the above Formula (14), the $R^{21}$ to $R^{24}$ be a tert-butyl group and the $R^{25}$ be a hydrogen atom.

Further, in the crystal nucleating agent according to the present invention, it is preferred that a fatty acid metal salt or a fatty acid amide compound be added at an amount of 0.01 to 1 parts by mass with respect to 100 parts by mass of the polyolefin-based resin.

Still further, in the crystal nucleating agent according to the present invention, it is preferred that the aforementioned fatty acid metal salt or fatty acid amide compound be selected from the group consisting of lithium stearate, calcium stearate, sodium stearate, ethylenebisstearoamide, ethylenebis(12-hydroxystearoamide) and stearic acid amide.

Further, in the crystal nucleating agent according to the present invention, it is preferred that the aforementioned polyolefin-based resin be a polypropylene-based resin.

Effects of the Invention

According to the present invention, by blending as crystal nucleating agent a crystal nucleating agent having the aforementioned specific structure to a polyolefin-based resin, a polyolefin-based resin composition having superior transparency can be provided. In addition, a polyolefin-based resin composition whose crystallization is facilitated can be provided.

MODE FOR CARRYING OUT THE INVENTION

The embodiments of the present invention will now be described concretely.

[Crystal Nucleating Agent (A)]

The crystal nucleating agent (A) according to the present invention comprises a structure in which at least 4 carbamate structures represented by the following Formula (1) are linked via $C_1$-$C_{10}$ hydrocarbon group:

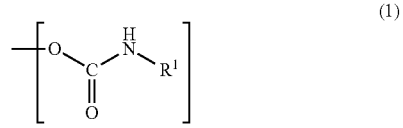

(1)

(wherein, $R^1$ represents a hydrogen atom, a $C_1$-$C_{12}$ alkyl group which is optionally branched, a $C_3$-$C_{12}$ cycloalkyl group which is optionally substituted or a $C_6$-$C_{18}$ aryl group which is optionally substituted; and the plural $R^1$s are each optionally different).

The aforementioned $C_1$-$C_{10}$ hydrocarbon group represents a compound constituted by a carbon atom(s) and hydrogen atoms. Examples of its molecular structure include alkane, alkene, cycloalkane and aromatic hydrocarbon, and at least 4 hydrogen atoms of such hydrocarbon group is substituted by the carbamate structure.

Examples of the $C_1$-$C_{12}$ alkyl group which is optionally branched, which is represented by $R^1$ in the above Formula (1), include methyl group, ethyl group, propyl group, isopropyl group, butyl group, sec-butyl group, tert-butyl group, isobutyl group, pentyl group, isopentyl group, tert-pentyl group, hexyl group, 2-hexyl group, 3-hexyl group, heptyl group, 2-heptyl group, 3-heptyl group, isoheptyl group, tert-heptyl group, n-octyl group, isooctyl group, tert-octyl group, nonyl group, isononyl group, decyl group, undecyl group and dodecyl group.

These alkyl groups are also optionally interrupted by an oxygen atom, sulfur atom, carbonyl group, ester group, amide group, imino group or the later-described aryl group, and the hydrogen atom(s) in these alkyl groups is/are also optionally substituted by a hydroxy group, halogen atom, amino group, nitro group, cyano group, alkenyl group, alkenyloxy group, alkanoyloxy group, chain aliphatic group such as alkoxycarbonyl group, pyrrole, furan, thiophene, imidazole, oxazole, thiazole, pyrazole, isoxazole, isothiazole, pyridine, pyridazine, pyrimidine, pyrazine, piperidine, piperazine, morpholine, 2H-pyran, 4H-pyran, phenyl, biphenyl, triphenyl, naphthalene, anthracene, pyrrolidine, pyrindine, indolizine, indole, isoindole, indazole, purine, quinolizine, quinoline, isoquinoline or cyclic aliphatic group such as the later-described cycloalkyl group. Further, such interruption(s) and substitution(s) may also exist in combination.

In addition, the aforementioned alkyl group may include a hydroxyalkyl group, alkoxyalkyl group, alkylaminoalkyl group, dialkylaminoalkyl group, alkoxycarbonylalkyl group, carboxyalkyl group, halogenated alkyl group, alkanoyloxyalkyl group, aminoalkyl group and the like.

Examples of the aforementioned hydroxyalkyl group include hydroxymethyl, 2-hydroxyethyl, 3-hydroxypropyl, 4-hydroxybutyl, 2-hydroxybutyl, 1-hydroxypentyl and 6-hydroxyhexyl. In the same manner as in the alkyl group, the alkyl group in the hydroxyalkyl group is optionally interrupted and the hydrogen atom(s) in the hydroxyalkyl group is/are optionally substituted, and such interruption(s) and substitution(s) may also exist in combination.

Examples of the aforementioned alkoxyalkyl group include methoxymethyl, methoxyethyl, methoxybutyl, ethoxyhexyl, ethoxymethyl, butoxyethyl, t-butoxyhexyl and hexyloxymethyl. In the same manner as in the aforementioned alkyl group, the alkyl group in the alkoxyalkyl group is optionally interrupted and the hydrogen atom(s) in the alkoxyalkyl group is/are optionally substituted, and such interruption(s) and substitution(s) may also exist in combination.

Examples of the aforementioned alkylaminoalkyl group include methylaminomethyl, ethylaminomethyl, hexylaminomethyl, ethylaminoethyl, hexylaminoethyl, methylaminopropyl, butylaminopropyl, methylaminobutyl, ethylaminobutyl, hexylaminobutyl, methylaminohexyl, ethylaminohexyl, butylaminohexyl and hexylaminohexyl. In the same manner as in the aforementioned alkyl group, the alkyl group in the alkylaminoalkyl group is optionally interrupted and the hydrogen atom(s) in the alkylaminoalkyl group is/are optionally substituted, and such interruption(s) and substitution(s) may also exist in combination.

Examples of the aforementioned dialkylaminoalkyl group include dimethylaminomethyl, diethylaminomethyl, dihexylaminomethyl, diethylaminoethyl, dihexylaminoethyl, dimethylaminopropyl, dibutylaminopropyl, dimethylaminobutyl, diethylaminobutyl, dihexylaminobutyl, dimethylaminohexyl, diethylaminohexyl, dibutylaminohexyl and dihexylaminohexyl. In the same manner as in the alkyl group, the alkyl group in the dialkylaminoalkyl group is optionally interrupted and the hydrogen atom(s) in the dialkylaminoalkyl group is/are optionally substituted, and such interruption(s) and substitution(s) may also exist in combination.

Examples of the aforementioned alkoxycarbonylalkyl group include methoxycarbonylmethyl, methoxycarbonylethyl, methoxycarbonylhexyl, ethoxycarbonylmethyl, ethoxycarbonylethyl, propoxycarbonylmethyl, isopropoxycarbonylmethyl, but oxycarbonylmethyl, pentyloxycarbonylmethyl, hexyloxycarbonylmethyl, hexyloxycarbonylbutyl and hexyloxycarbonylhexyl.

In the same manner as in the aforementioned alkyl group, the alkyl group in the alkoxycarbonylalkyl group is optionally interrupted and the hydrogen atom(s) in the alkoxycarbonylalkyl group is/are optionally substituted, and such interruption(s) and substitution(s) may also exist in combination.

Examples of the aforementioned carboxyalkyl group include carboxymethyl, carboxyethyl, carboxybutyl and carboxyhexyl. In the same manner as in the aforementioned alkyl group, the alkyl group in the carboxyalkyl group is optionally interrupted and the hydrogen atom(s) in the carboxyalkyl group is/are optionally substituted, and such interruption(s) and substitution(s) may also exist in combination.

Examples of the aforementioned halogenated alkyl group include monochloromethyl, monobromomethyl, monoiodomethyl, monofluoromethyl, dichloromethyl, dibromomethyl, diiodomethyl, difluoromethyl, trichloromethyl, tribromomethyl, triiodomethyl, trifluoromethyl, dibromobutyl, diiodobutyl, difluorobutyl, chlorohexyl, bromohexyl, iodohexyl and fluorohexyl. In the same manner as in the aforementioned alkyl group, the alkyl group in the halogenated alkyl group is optionally interrupted(s) and the hydrogen atom(s) in the halogenated alkyl group is/are optionally substituted, and such interruption and substitution(s) may also exist in combination.

Examples of the aforementioned alkanoyloxyalkyl group include acetoxymethyl, 2-acetoxyethyl, propionyloxymethyl and 1-hexanoyloxy-2-methylpentyl. In the same manner as in the aforementioned alkyl group, the alkyl group in the alkanoyloxyalkyl group is optionally interrupted and the hydrogen atom(s) in the alkanoyloxyalkyl group is/are optionally substituted, and such interruption(s) and substitution(s) may also exist in combination.

Examples of the aforementioned aminoalkyl group include aminomethyl group, aminoethyl group, aminopropyl group, aminobutyl group, aminopentyl group and aminohexyl group. In the same manner as in the aforementioned alkyl group, the alkyl group in the aminoalkyl group is optionally interrupted and the hydrogen atom(s) in the aminoalkyl group is/are optionally substituted, and such interruption(s) and substitution(s) may also exist in combination.

Examples of the $C_6$-$C_{18}$ aryl group which is optionally substituted, which is represented by the $R^1$ in the above Formula (1), include phenyl group, 4-hydroxyphenyl group, 3,4,5-trimethoxyphenyl group, 4-tert-butylphenylgroup, biphenyl group, naphthyl group, methylnaphthyl group, anthracenyl group and phenanthryl, and the hydrogen atom(s) in the aryl group is/are also optionally substituted by a hydroxy group, halogen atom, nitro group, cyano group, alkyl group, alkoxy group, alkenyl group, alkenyloxy group, alkoxyalkyl group, alkanoyloxy group or alkoxycarbonyl group.

Examples of the $C_3$-$C_{12}$ cycloalkyl group which is optionally substituted, which is represented by the $R^1$ in the above Formula (1), include cyclopropyl group, cyclopentyl group, cyclohexyl group, cycloheptyl group, cyclooctyl group, cyclononyl group and cyclodecyl group, and the hydrogen atom(s) in the cycloalkyl group is/are also optionally substituted by a halogen atom, alkyl group, alkoxy group, alkenyl group, alkenyloxy group, alkoxyalkyl group, alkanoyloxy group, alkoxycarbonyl group, nitrile group or cyano group.

Examples of the specific structure of the compound represented by the above Formula (1) in the present invention include the following Compounds A-1 to A-9. However, the present invention is not restricted by the following compounds.
Compound A-1
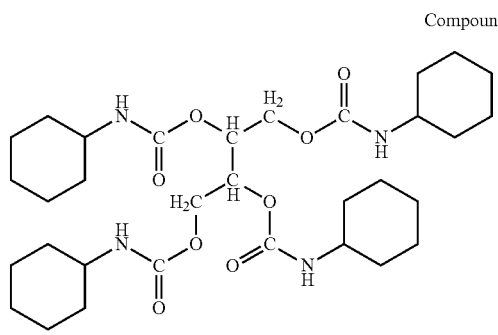
Compound A-2
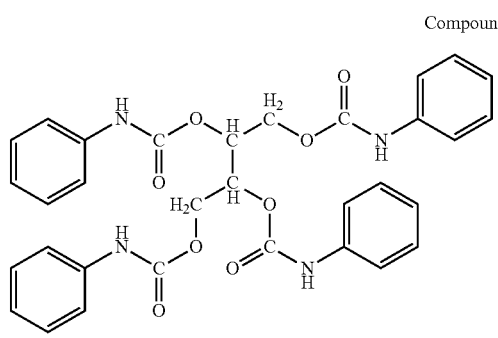
Compound A-3
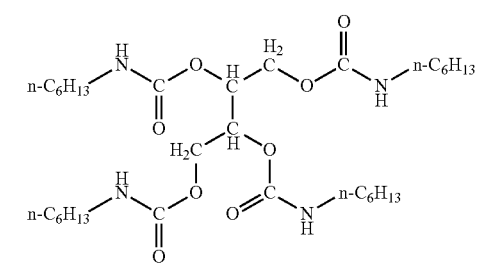
Compound A-4
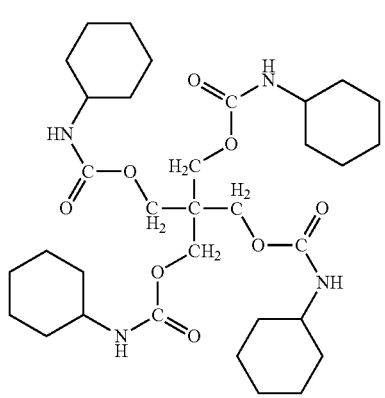
-continued
Compound A-5
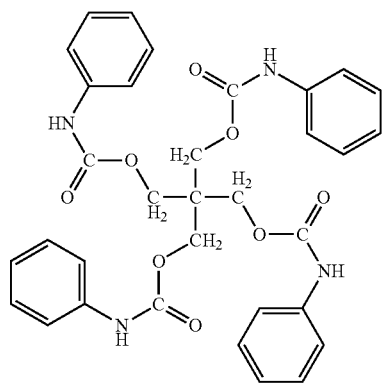
Compound A-6
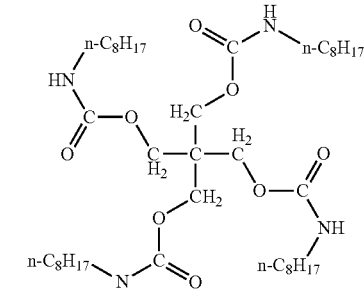
Compound A-7
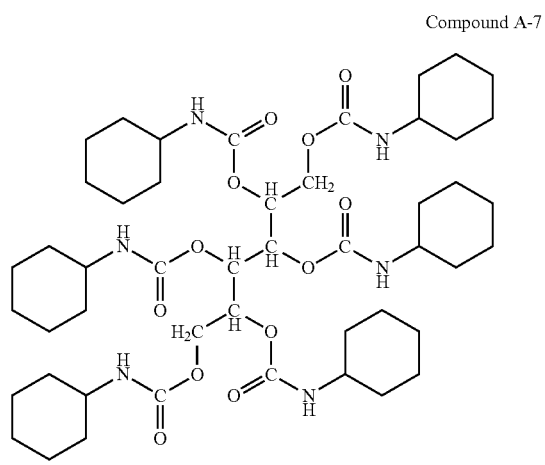
Compound A-8
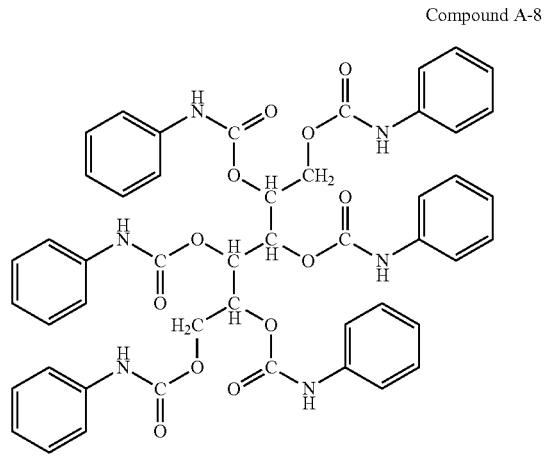

Compound A-9

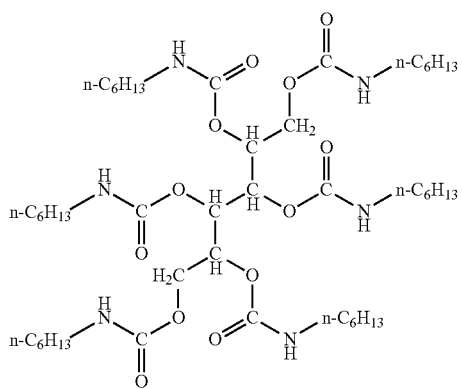

Among those crystal nucleating agent (A)s represented by the above Formula (1), one which is represented by the following Formula (7):

(7)

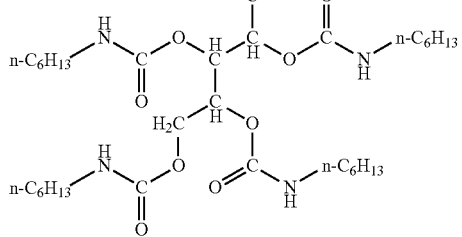

(wherein, $R^{13}$ has the same definition as $R^1$ in the above Formula (1); l represents an integer of 2 to 10; and the plural $R^{13}$s are each optionally different); or a compound having a structure represented by the following Formula (8):

(8)

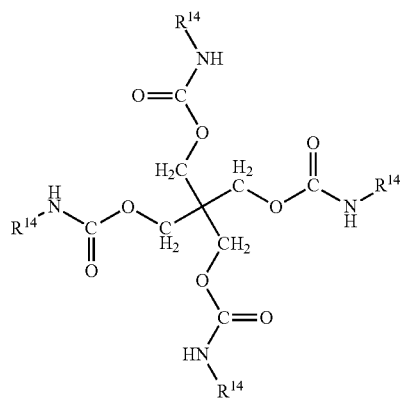

(wherein, $R^{14}$ has the same definition as $R^1$ in the above Formula (1); and the plural $R^{14}$s are each optionally different) may be preferably used.

Among those crystal nucleating agent (A)s represented by the above Formula (1), a compound having a structure represented by the following Formula (18):

(18)

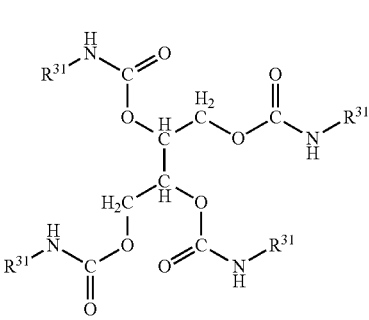

(wherein, $R^{31}$ has the same definition as $R^1$ in the above Formula (1); and the plural $R^{31}$s are each optionally different) is particularly suitable.

Specifically the compound comprising a structure in which at least 4 carbamate structures represented by the following Formula (1) are linked via $C_1$-$C_{10}$ hydrocarbon group may be produced in accordance with the later-described Synthesis Example; however, in general, it may be produced in accordance with the following Reaction Formula (A) or (B). That is, it may be easily produced by allowing a polyalcohol compound such as erythritol or pentaerythritol, an isocyanate compound and the like to react while heating the mixture to reflux in a solvent such as dimethylacetamide, as required.

Reaction Formula (A):

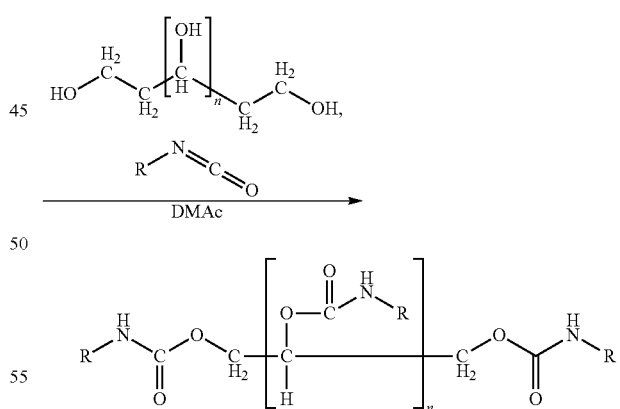

DMAc: dimethylacetamide

Reaction Formula (B):

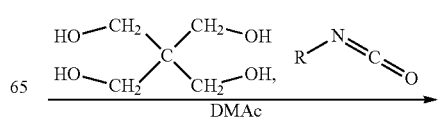

-continued

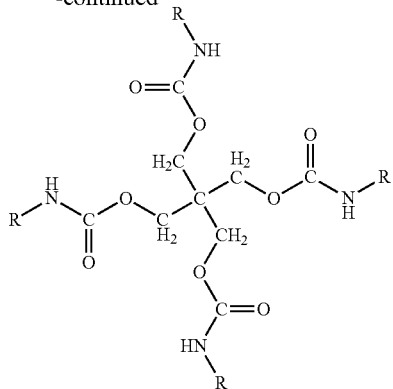

DMAc: dimethylacetamide

[Crystal Nucleating Agent (B)]

The crystal nucleating agent (B) according to the present invention is represented by the following Formula (2):

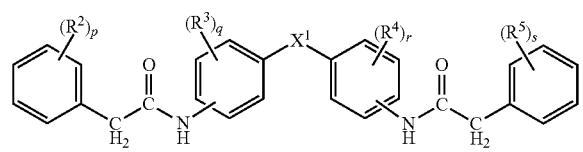

(wherein, $X^1$ is a $C_1$-$C_5$ alkylene group which is optionally branched; $R^2$ to $R^5$ independently represent one selected from the group consisting of a halogen atom, a $C_1$-$C_4$ alkyl group which is optionally substituted and/or is optionally branched and a $C_1$-$C_4$ alkoxy group which is optionally substituted and/or is optionally branched; and p, q, r and s independently represent an integer of 0 to 3 (provided that p and s are not 0)).

Examples of the $C_1$-$C_5$ alkylene group which is optionally branched, which is represented by the $X^1$ in the above Formula (2), include methylene group, ethylene group, propylene group, butylene group, isobutylene group and pentylene group. In these alkylene groups, —$CH_2$— is optionally substituted by —O—, —CO—, —COO— or OCO—, and the hydrogen atom(s) in the alkylene groups is/are also optionally substituted by a halogen atom, alkenyl group, alkenyloxy group, alkanoyloxy group, alkoxycarbonyl group, nitrile group, cyano group, aryl group or saturated aliphatic ring.

Examples of the $C_1$-$C_4$ alkyl group which is optionally substituted and/or is optionally branched, which is represented by the $R^2$ to $R^5$ in the above Formula (2), include methyl group, ethyl group, propyl group, isopropyl group, butyl group and t-butyl group. In the alkyl group, —$CH_2$— is optionally interrupted by —O— or —S—, and the hydrogen atom(s) in the alkyl group is/are also optionally substituted by a halogen atom, alkoxy group, alkenyl group, alkenyloxy group, alkoxyalkyl group, alkanoyloxy group, alkoxycarbonyl group, nitrile group, cyano group, aryl group or saturated aliphatic ring.

In addition, the aforementioned alkyl group may include hydroxyalkyl group, alkoxyalkyl group, alkylaminoalkyl group, dialkylaminoalkyl group, alkoxycarbonylalkyl group, carboxyalkyl group, halogenated alkyl group, alkanoyloxyalkyl group, aminoalkyl group and the like.

Examples of the aforementioned hydroxyalkyl group include hydroxymethyl group, 2-hydroxyethyl group, 3-hydroxypropyl group, 4-hydroxybutyl group and 2-hydroxybutyl group. In the same manner as in the alkyl group, the alkyl group in the hydroxyalkyl group is optionally interrupted and the hydrogen atom(s) in the hydroxyalkyl group is/are optionally substituted, and such interruption(s) and substitution(s) may also exist in combination.

Examples of the aforementioned alkoxyalkyl group include methoxymethyl group, methoxyethyl group, methoxybutyl group, ethoxymethyl group, butoxyethyl group and hexyloxymethyl group. In the same manner as in the aforementioned alkyl group, the alkyl group in the alkoxyalkyl group is optionally interrupted and the hydrogen atom(s) in the alkoxyalkyl group is/are optionally substituted, and such interruption(s) and substitution(s) may also exist in combination.

Examples of the aforementioned alkylaminoalkyl group include methylaminomethyl group, ethylaminomethyl group, hexylaminomethyl group, ethylaminoethyl group, hexylaminoethyl group, methylaminopropyl group, butylaminopropyl group, methylaminobutyl group, ethylaminobutyl group and hexylaminobutyl group. In the same manner as in the aforementioned alkyl group, the alkyl group in the alkylaminoalkyl group is optionally interrupted and the hydrogen atom(s) in the alkylaminoalkyl group is/are optionally substituted, and such interruption(s) and substitution(s) may also exist in combination.

Examples of the aforementioned dialkylaminoalkyl group include dimethylaminomethyl group, diethylaminomethyl group, dihexylaminomethyl group, diethylaminoethyl group, dihexylaminoethyl group, dimethylaminopropyl group, dibutylaminopropyl group, dimethylaminobutyl group, diethylaminobutyl group and dihexylaminobutyl group. In the same manner as in the aforementioned alkyl group, the alkyl group in the dialkylaminoalkyl group is optionally interrupted and the hydrogen atom(s) in the dialkylaminoalkyl group is/are optionally substituted, and such interruption(s) and substitution(s) may also exist in combination.

Examples of the aforementioned alkoxycarbonylalkyl group include methoxycarbonylmethyl group, methoxycarbonylethyl group, ethoxycarbonylmethyl group, ethoxycarbonylethyl group, propoxycarbonylmethyl group, isopropoxycarbonylmethyl group, butoxycarbonylmethyl group, pentyloxycarbonylmethyl group, hexyloxycarbonylmethyl group and hexyloxycarbonylbutyl group. In the same manner as in the aforementioned alkyl group, the alkyl group in the alkoxycarbonylalkyl group is optionally interrupted and the hydrogen atom(s) in the alkoxycarbonylalkyl group is/are optionally substituted, and such interruption(s) and substitution(s) may also exist in combination.

Examples of the aforementioned carboxyalkyl group include carboxymethyl group, carboxyethyl group and carboxybutyl group. In the same manner as in the aforementioned alkyl group, the alkyl group in the carboxyalkyl group is optionally interrupted and the hydrogen atom(s) in the carboxyalkyl group is/are optionally substituted, and such interruption(s) and substitution(s) may also exist in combination.

Examples of the aforementioned halogenated alkyl group include monochloromethyl group, monobromomethyl group, monoiodomethyl group, monofluoromethyl group, dichloromethyl group, dibromomethyl group, diiodomethyl group, difluoromethyl group, trichloromethyl group, tribromomethyl group, triiodomethyl group, trifluoromethyl group, dibromobutyl group, diiodobutyl group and difluorobutyl group. In the same manner as in the aforementioned alkyl group, the alkyl group in the halogenated alkyl group is optionally interrupted and the hydrogen atom(s) in the halogenated alkyl group is/are optionally substituted, and such interruption(s) and substitution(s) may also exist in combination.

Examples of the aforementioned alkanoyloxyalkyl group include acetoxymethyl group, 2-acetoxyethyl group and propionyloxymethyl group. In the same manner as in the aforementioned alkyl group, the alkyl group in the alkanoyloxyalkyl group is optionally interrupted and the hydrogen atom(s) in the alkanoyloxyalkyl group is/are optionally substituted, and such interruption(s) and substitution(s) may also exist in combination.

Examples of the aforementioned aminoalkyl group include aminomethyl group, aminoethyl group, aminopropyl group and aminobutyl group. In the same manner as in the aforementioned alkyl group, the alkyl group in the aminoalkyl group is optionally interrupted and the hydrogen atom(s) in the aminoalkyl group is/are optionally substituted, and such interruption(s) and substitution(s) may also exist in combination.

Examples of the $C_1$-$C_4$ alkoxy group which is optionally substituted and/or is optionally branched, which is represented by the $R^2$ to $R^5$ in the above Formula (2), include methoxy group, ethoxy group, propoxy group, isopropoxy group and butoxy group. In these alkoxy groups, —$CH_2$— is optionally substituted by —O—, —CO—, —COO— or OCO—, and the hydrogen atom(s) in the alkoxy groups is/are also optionally substituted by a halogen atom, alkenyl group, alkenyloxy group alkoxyalkyl group, alkanoyloxy group, alkoxycarbonyl group, nitrile group, cyano group, aryl group or saturated aliphatic ring.

Examples of the specific structure of the crystal nucleating agent represented by the above Formula (2) in the present invention include the following Compounds B-1 to B-9. However, the present invention is not restricted by the following compounds.

Compound B-1

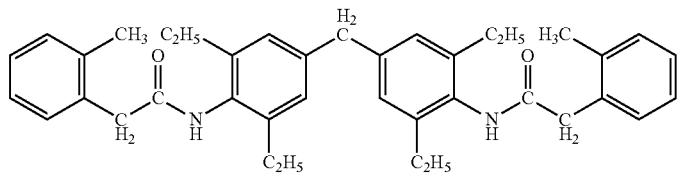

Compound B-2

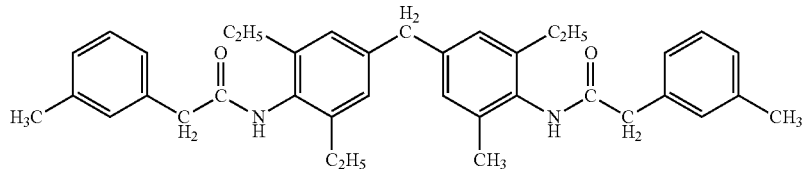

Compound B-3

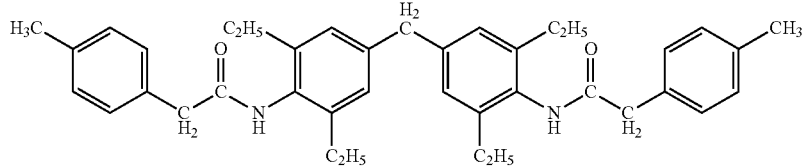

Compound B-4

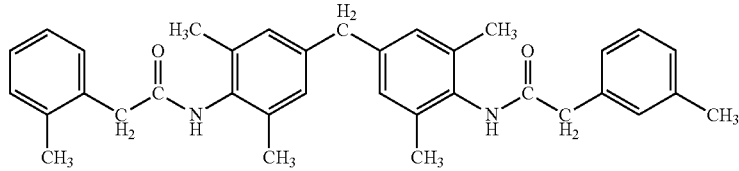

Compound B-5

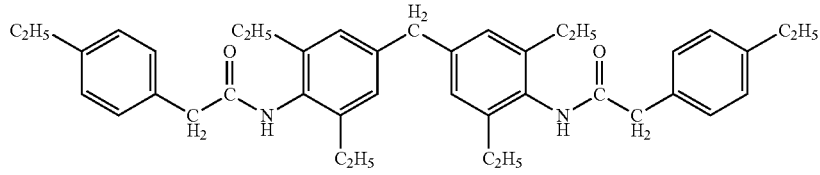

Compound B-6

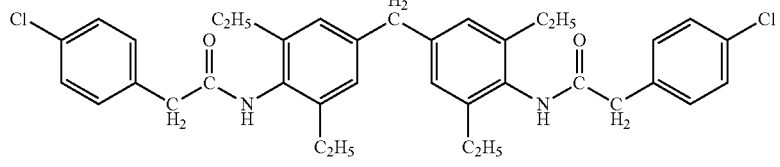

Compound B-7

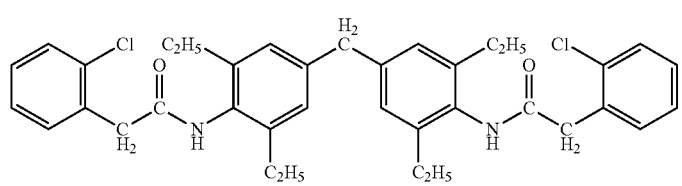

Compound B-8

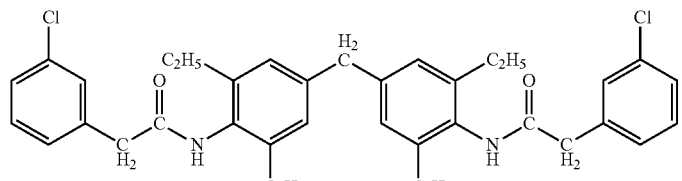

Compound B-9

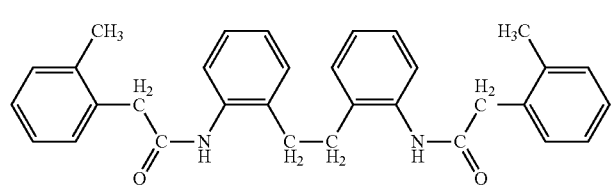

Among the crystal nucleating agents represented by the above Formula (2), a compound in which the $R^2$ and $R^5$ in the above Formula (2) are at an ortho position of the benzene ring is particularly preferably used.

Further, among the crystal nucleating agents represented by the above Formula (2), a compound in which the p and s are 1 and the q and r are 2 in the above Formula 2 is particularly preferably used.

Specifically, the compound represented by the above Formula (2) may be produced in accordance with the later-described Synthesis Example; however, in general, it may be produced in accordance with the following Reaction Formula (C). That is, it may be easily produced by allowing a diamine compound and carboxylic acid halide to react while heating the mixture to reflux in a solvent such as dimethylacetamide using, as required, pyridine as catalyst.

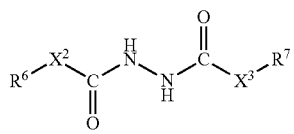

(3)

(wherein, $R^6$ and $R^7$ independently represent a $C_1$-$C_{10}$ alkyl group which is optionally branched and/or is optionally substituted, a $C_3$-$C_{12}$ cycloalkyl group which is optionally substituted or a $C_6$-$C_{20}$ aryl group which is optionally substituted; and $X^2$ and $X^3$ independently represent a single bond or a $C_1$-$C_5$ alkylene group; provided that the substituent(s) is/are not a hydroxyl group).

Examples of the $C_1$-$C_{10}$ alkyl group which is optionally branched and/or is optionally substituted, which is repre- Reaction Formula (C):

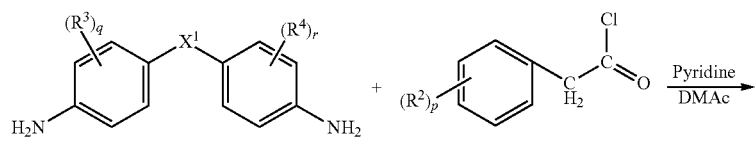

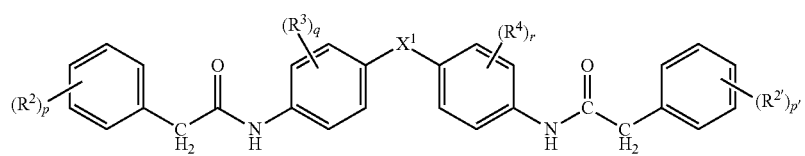

DMAc: dimethylacetamide

[Crystal Nucleating Agent (C)]

The crystal nucleating agent (C) according to the present invention is a hydrazide compound represented by the Formula (3):

sented by the $R^6$ or $R^7$ in the above Formula (3), include methyl group, ethyl group, propyl group, isopropyl group, butyl group, sec-butyl group, tert-butyl group, isobutyl group, pentyl group, isopentyl group, tert-pentyl group, hexyl group, 2-hexyl group, 3-hexyl group, heptyl group, 2-heptyl group, 3-heptyl group, isoheptyl group, tert-heptyl group, n-octyl group, isooctyl group, tert-octyl group, nonyl group, isononyl group and decyl group.

These alkyl groups are optionally interrupted by an oxygen atom, sulfur atom, carbonyl group, ester group, amide group, imino group or the later-described aryl group, and the hydrogen atom(s) in the alkyl groups is/are also optionally substituted by a halogen atom, amino group, nitro group, cyano group, alkenyl group, alkenyloxy group, alkanoyloxy group, chain aliphatic group such as alkoxycarbonyl group, pyrrole, furan, thiophene, imidazole, oxazole, thiazole, pyrazole, isoxazole, isothiazole, pyridine, pyridazine, pyrimidine, pyrazine, piperidine, piperazine, morpholine, 2H-pyran, 4H-pyran, phenyl, biphenyl, triphenyl, naphthalene, anthracene, pyrrolidine, pyrindine, indolizine, indole, isoindole, indazole, purine, quinolizine, quinoline, isoquinoline or cyclic aliphatic group such as the later-described cycloalkyl group. Further, such interruption(s) and substitution(s) may also exist in combination, and as a result of the aforementioned substitution(s), these alkyl groups optionally have an unsaturated bond.

Examples of the $C_3$-$C_{12}$ cycloalkyl group which is optionally substituted, which is represented by the $R^6$ or $R^7$ in the above Formula (3), include cyclopropyl group, cyclopentyl group, cyclohexyl group, cycloheptyl group, cyclooctyl group, cyclononyl group and cyclodecyl group, and the hydrogen atom(s) in the cycloalkyl group is/are optionally substituted by a halogen atom, alkyl group, alkoxy group, alkenyl group, alkenyloxy group, alkoxyalkyl group, alkanoyloxy group, alkoxycarbonyl group, nitrile group or cyano group.

In the $C_6$-$C_{20}$ aryl group which is optionally substituted, which is represented by the $R^6$ or $R^7$ in the above Formula (3), the hydrogen atom(s) in the aryl groups is/are optionally substituted by a halogen atom, nitro group, cyano group, alkyl group, alkoxy group, alkenyl group, alkenyloxy group, alkoxyalkyl group, alkanoyloxy group or alkoxycarbonyl group. Examples of such aryl groups include phenyl group, 3,4,5-trimethoxyphenyl group, 4-tert-butylphenyl group, biphenyl group, naphthyl group, methylnaphthyl group, anthracenyl group and phenanthryl.

Examples of the $C_1$-$C_5$ alkylene group represented by the $X^2$ or $X^3$ in the above Formula (3) include methylene, ethylene, propylene, 2-methylpropylene, 2-ethylpropylene, butylene and 2-methylbutylene.

Among the aforementioned crystal nucleating agents, in the present invention, a compound having a structure in which, in the above Formula (3), each of the $R^6$ and $R^7$ is a $C_3$-$C_{12}$ cycloalkyl group which is optionally substituted or a phenyl group which is optionally substituted, the substituent(s) not being a hydroxyl group, is particularly preferably used.

Particularly preferred thereamong is a compound having a structure in which, in the above Formula (3), the $R^6$ and $R^7$ are a $C_3$-$C_{12}$ cycloalkyl group which is optionally substituted, the substituent(s) not being a hydroxyl group, and the $X^2$ and $X^3$ are a single bond. Further, a compound having a structure in which, in the above Formula (3), the $R^6$ and $R^7$ are a cyclohexyl group or a phenyl group which optionally has a $C_1$-$C_{12}$ alkyl group as substituent and the $X^2$ and $X^3$ are a single bond is more preferred.

In the present invention, it is preferred that the crystal nucleating agent (C) represented by the above Formula (3) be at least one selected from the group consisting of crystal nucleating agents represented by the following Formulae (9) to (11):

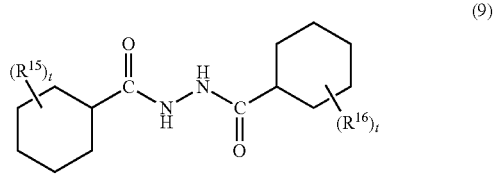

(9)

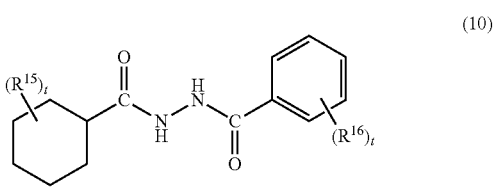

(10)

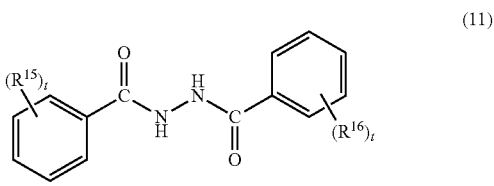

(11)

(wherein, $R^{15}$ and $R^{16}$ independently have the same definition as the $R^6$ in the above Formula (3); and t represents 0 or 1).

Examples of the specific structure of the crystal nucleating agent represented by the above Formula (3) in the present invention include the following Compounds C-1 to C-8. However, the present invention is not restricted by the following compounds.

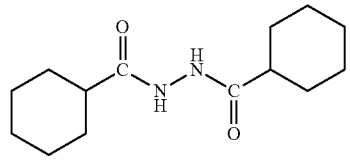

Compound C-1

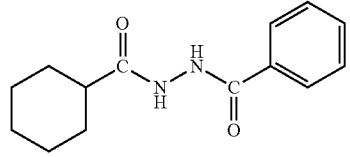

Compound C-2

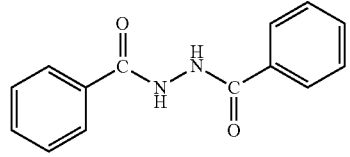

Compound C-3

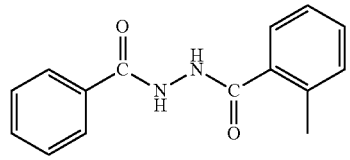

Compound C-4

Compound C-5

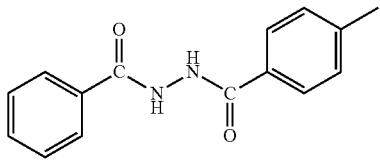

Compound C-6

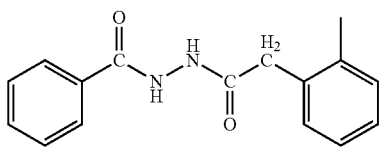

Compound C-7

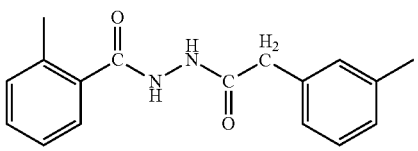

Compound C-8

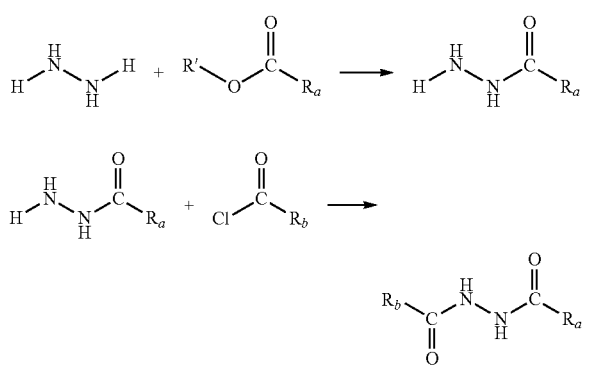

The crystal nucleating agent (C) represented by the above Formula (3) may be produced in accordance with a known synthesis example, and in general, it may be produced in accordance with the following Reaction Formula (D). That is, it may be easily synthesized by a condensation reaction between hydrazine or a derivative thereof and a carboxylic acid compound or by a reaction between hydrazine or a derivative thereof and an acid halide.

Reaction Formula (D):

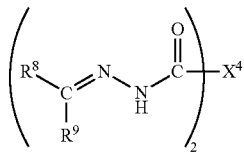

[Crystal Nucleating Agents (D) and (E)]

The crystal nucleating agent (D) according to the present invention is a hydrazone compound represented by the following Formula (4):

$$\left( R^8 \underset{R^9}{\overset{}{C}} = N - \underset{H}{\overset{}{N}} - \overset{O}{\overset{\|}{C}} \right)_2 X^4 \quad (4)$$

(wherein, $R^8$ and $R^9$ independently represent a hydrogen atom, a $C_1$-$C_{12}$ alkyl group which is optionally branched and/or is optionally substituted, a $C_3$-$C_{12}$ cycloalkyl group which is optionally substituted or a $C_6$-$C_{18}$ aryl group which is optionally substituted; $R^8$ and $R^9$ optionally form a $C_6$-$C_{18}$ ring with a carbon atom at a terminal of the hydrazone structure; and $X^4$ represents a $C_1$-$C_{10}$ alkylene group which is optionally branched and/or is optionally substituted, a $C_3$-$C_{12}$ cycloalkylene group which is optionally substituted or a $C_6$-$C_{20}$ arylene group which is optionally substituted).

The crystal nucleating agent (E) according to the present invention is a hydrazone compound represented by the following Formula (5):

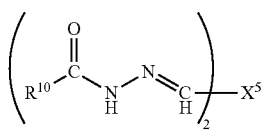

(wherein, $R^{10}$ represents a hydrogen atom, a $C_1$-$C_{12}$ alkyl group which is optionally branched and/or is optionally substituted, a $C_3$-$C_{12}$ cycloalkyl group which is optionally substituted or a $C_6$-$C_{18}$ aryl group which is optionally substituted; and $X^5$ represents a $C_1$-$C_{10}$ alkylene group which is optionally branched and/or is optionally substituted, a $C_3$-$C_{12}$ cycloalkylene group which is optionally substituted or a $C_6$-$C_{20}$ arylene group which is optionally substituted).

Examples of the $C_1$-$C_{12}$ alkyl group which is optionally branched, which is represented by the $R^8$ and $R^9$ in the above Formula (4) or the $R^{10}$ in the above Formula (5), include methyl group, ethyl group, propyl group, isopropyl group, butyl group, sec-butyl group, tert-butyl group, isobutyl group, pentyl group, isopentyl group, tert-pentyl group, hexyl group, 2-hexyl group, 3-hexyl group, heptyl group, 2-heptyl group, 3-heptyl group, isoheptyl group, tert-heptyl group, n-octyl group, isooctyl group, tert-octyl group, nonyl group, isononyl group, decyl group, undecyl group and dodecyl group.

These alkyl groups are optionally interrupted by an oxygen atom, sulfur atom, carbonyl group, ester group, amide group, imino group or the later-described aryl group, and the hydrogen atom(s) in these alkyl groups is/are also optionally substituted by a hydroxy group, halogen atom, amino group, nitro group, cyano group, alkenyl group, alkenyloxy group, alkanoyloxy group, chain aliphatic group such as alkoxycarbonyl group, heterocyclic group such as pyrrole, furan, thiophene, imidazole, oxazole, thiazole, pyrazole, isoxazole, isothiazole, pyridine, pyridazine, pyrimidine, pyrazine, piperidine, piperazine, morpholine, 2H-pyran, 4H-pyran, pyrrolidine, pyrindine, indolizine, indole, isoindole, indazole, purine, quinolizine, quinoline or isoquinoline, aryl group such as phenyl, biphenyl, triphenyl, naphthyl or anthracenyl, or cyclic aliphatic group such as the later-described cycloalkyl group. Further, such interruption(s) and substitution(s) may also exist in combination.

In addition, the aforementioned alkyl group may include a hydroxyalkyl group, alkoxyalkyl group, alkylaminoalkyl group, dialkylaminoalkyl group, alkoxycarbonylalkyl group, carboxyalkyl group, halogenated alkyl group, alkanoyloxyalkyl group, aminoalkyl group and the like.

Examples of the aforementioned hydroxyalkyl group include hydroxymethyl, 2-hydroxyethyl, 3-hydroxypropyl, 4-hydroxybutyl, 2-hydroxybutyl, 1-hydroxypentyl and 6-hydroxyhexyl. In the same manner as in the aforementioned alkyl group, the alkyl group in the hydroxyalkyl group is optionally interrupted and the hydrogen atom(s) in the hydroxyalkyl group is/are optionally substituted, and such interruption(s) and substitution(s) may also exist in combination.

Examples of the aforementioned alkoxyalkyl group include methoxymethyl, methoxyethyl, methoxybutyl, ethoxyhexyl, ethoxymethyl, butoxyethyl, t-butoxyhexyl and hexyloxymethyl. In the same manner as in the aforementioned alkyl group, the alkyl group in the alkoxyalkyl group is optionally interrupted and the hydrogen atom(s) in the alkoxyalkyl group is/are optionally substituted, and such interruption(s) and substitution(s) may also exist in combination.

Examples of the aforementioned alkylaminoalkyl group include methylaminomethyl, ethylaminomethyl, hexylaminomethyl, ethylaminoethyl, hexylaminoethyl, methylaminopropyl, butylaminopropyl, methylaminobutyl, ethylaminobutyl, hexylaminobutyl, methylaminohexyl, ethylaminohexyl, butylaminohexyl and hexylaminohexyl. In the same manner as in the aforementioned alkyl group, the alkyl group in the alkylaminoalkyl group is optionally interrupted and the hydrogen atom(s) in the alkylaminoalkyl group is/are optionally substituted, and such interruption(s) and substitution(s) may also exist in combination.

Examples of the aforementioned dialkylaminoalkyl group include dimethylaminomethyl, diethylaminomethyl, dihexylaminomethyl, diethylaminoethyl, dihexylaminoethyl, dimethylaminopropyl, dibutylaminopropyl, dimethylaminobutyl, diethylaminobutyl, dihexylaminobutyl, dimethylaminohexyl, diethylaminohexyl, dibutylaminohexyl and dihexylaminohexyl. In the same manner as in the aforementioned alkyl group, the alkyl group in the dialkylaminoalkyl group is optionally interrupted and the hydrogen atom(s) in the dialkylaminoalkyl group is/are optionally substituted, and such interruption(s) and substitution(s) may also exist in combination.

Examples of the aforementioned alkoxycarbonylalkyl group include methoxycarbonylmethyl, methoxycarbonylethyl, methoxycarbonylhexyl, ethoxycarbonylmethyl, ethoxycarbonylethyl, propoxycarbonylmethyl, isopropoxycarbonylmethyl, butoxycarbonylmethyl, pentyloxycarbonylmethyl, hexyloxycarbonylmethyl, hexyloxycarbonylbutyl and hexyloxycarbonylhexyl. In the same manner as in the aforementioned alkyl group, the alkyl group in the alkoxycarbonylalkyl group is optionally interrupted and the hydrogen atom(s) in the alkoxycarbonylalkyl group is/are optionally substituted, and such interruption(s) and substitution(s) may also exist in combination.

Examples of the aforementioned carboxyalkyl group include carboxymethyl, carboxyethyl, carboxybutyl and carboxyhexyl. In the same manner as in the aforementioned alkyl group, the alkyl group in the carboxyalkyl group is optionally interrupted and the hydrogen atom(s) in the carboxyalkyl group is/are optionally substituted, and such interruption(s) and substitution(s) may also exist in combination.

Examples of the aforementioned halogenated alkyl group include monochloromethyl, monobromomethyl, monoiodomethyl, monofluoromethyl, dichloromethyl, dibromomethyl, diiodomethyl, difluoromethyl, trichloromethyl, tribromomethyl, triiodomethyl, trifluoromethyl, dibromobutyl, diiodobutyl, difluorobutyl, chlorohexyl, bromohexyl, iodohexyl and fluorohexyl. In the same manner as in the aforementioned alkyl group, the alkyl group in the halogenated alkyl group is optionally interrupted and the hydrogen atom(s) in the halogenated alkyl group is/are optionally substituted, and such interruption(s) and substitution(s) may also exist in combination.

Examples of the aforementioned alkanoyloxyalkyl group include acetoxymethyl, 2-acetoxyethyl, propionyloxymethyl and 1-hexanoyloxy-2-methylpentyl. In the same manner as in the aforementioned alkyl group, the alkyl group in the alkanoyloxyalkyl group is optionally interrupted and the hydrogen atom(s) in the alkanoyloxyalkyl group is/are optionally substituted, and such interruption(s) and substitution(s) may also exist in combination.

Examples of the aforementioned aminoalkyl group include aminomethyl group, aminoethyl group, aminopropyl group, aminobutyl group, aminopentyl group and aminohexyl group. In the same manner as in the aforementioned alkyl group, the alkyl group in the aminoalkyl group is optionally interrupted and the hydrogen atom(s) in the aminoalkyl group is/are optionally substituted, and such interruption(s) and substitution(s) may also exist in combination.

Examples of the $C_3$-$C_{12}$ cycloalkyl group which is optionally substituted, which is represented by the $R^8$ and $R^9$ in the above Formula (4) or the $R^{10}$ in the above Formula (5), include cyclopropyl group, cyclopentyl group, cyclohexyl group, cycloheptyl group, cyclooctyl group, cyclononyl group and cyclodecyl group, and the hydrogen atom(s) in the cycloalkyl group is/are also optionally substituted by a halogen atom, alkyl group, alkoxy group, alkenyl group, alkenyloxy group, alkoxyalkyl group, alkanoyloxy group, alkoxycarbonyl group, nitrile group or cyano group.

Examples of the $C_6$-$C_{18}$ aryl group which is optionally substituted, which is represented by the $R^8$ and $R^9$ in the above Formula (4) or the $R^{10}$ in the above Formula (5), include phenyl group, 4-hydroxyphenyl group, 3,4,5-trimethoxyphenyl group, 4-tert-butylphenyl group, biphenyl group, naphthyl group, methylnaphthyl group, anthracenyl group, phenanthryl group and 9-aminoanthracenyl group, and the hydrogen atom(s) in the aryl group is/are also optionally substituted by a hydroxy group, halogen atom, nitro group, cyano group, alkyl group, alkoxy group, alkenyl group, alkenyloxy group, alkoxyalkyl group, alkanoyloxy group, amino group, imino group or alkoxycarbonyl group.

Examples of the $C_6$-$C_{18}$ ring which the aforementioned $R^8$ and $R^9$ form with a carbon atom at a terminal of the hydrazone structure include cycloalkyl groups such as cyclohexyl group, cycloheptyl group, cyclooctyl group, cyclononyl group, cyclodecyl group, cycloundecyl group and cyclododecyl group; and the aforementioned $C_6$-$C_{18}$ aryl group which is optionally substituted.

Examples of the $C_1$-$C_{10}$ alkylene group which is optionally substituted and/or is optionally branched, which is represented by the $X^4$ and $X^5$ in the above Formula (4) or (5), include methylene group, ethylene group, propylene group, methylethylene group, butylene group, 1-methylpropylene group, 2-methylpropylene group, 1,2-dimethylpropylene group, 1,3-dimethylpropylene group, 1-methylbutylene group, 2-methylbutylene group, 3-methylbutylene group, 4-methylbutylene group, 2,4-dimethylbutylene group, 1,3-dimethylbutylene group, pentylene group, hexylene group, heptylene group and octylene group. The hydrogen atom(s) in the alkylene group is/are optionally substituted by a halogen atom, alkyl group, alkoxy group, alkenyl group, alkenyloxy group, alkoxyalkyl group, alkanoyloxy group, alkoxycarbonyl group, nitrile group or cyano group.

Examples of the $C_3$-$C_6$ cycloalkylene group which is optionally substituted, which is represented by the $X^4$ and $X^5$ in the above Formula (4) or (5), include 1,2-cyclopropylene group, 1,3-cycloheptylene group and trans-1,4-cyclohexylene group. The hydrogen atom(s) in the aforementioned cycloalkylene group is/are optionally substituted by a halogen atom, alkyl group, alkoxy group, alkenyl group, alkenyloxy group, alkoxyalkyl group, alkanoyloxy group, alkoxycarbonyl group, nitrile group or cyano group.

Examples of the $C_6$-$C_{20}$ arylene group which is optionally substituted, which is represented by the $X^4$ and $X^5$ in the above Formula (4) or (5), include 1,4-phenylene group, 1,3-phenylene group, 1,5-naphthylene group, 2,6-naphthylene group, 2,6-phenalene group, 1,6-phenanthlene group, 2,7-phenanthlene group and 2,6-anthracene group. The hydrogen atom(s) in the aforementioned cycloalkylene group is/are optionally substituted by a halogen atom, alkyl group, alkoxy group, alkenyl group, alkenyloxy group, alkoxyalkyl group, alkanoyloxy group, alkoxycarbonyl group, nitrile group or cyano group.

Further, among the aforementioned crystal nucleating agents, those in which the $R^8$ and $R^9$ in the above Formula (4) or the $R^{10}$ in the above Formula (5) are/is an alkyl group having a greater number of carbon atoms exhibit the effect as crystal nucleating agent of the polyolefin-based resin; however, since the heat-resistance of the compound per se may be deteriorated and consequently, the polyolefin-based resin composition may be degraded during the molding thereof, thereby adversely affecting the molded article, in the present invention, the number of carbon atoms of the alkyl group represented by the $R^8$, $R^9$ or $R^{10}$ is preferably within the range of 1 to 8, particularly preferably within the range of 1 to 5.

Examples of the specific structure of the crystal nucleating agent (D) which is represented by the above Formula (4) and used in the present invention include the following Compounds D-1 to D-9, and examples of the specific structure of the crystal nucleating agent (E) which is represented by the above Formula (5) include the following Compounds E-1 to E-8. However, the present invention is not restricted by the following compounds.

Compound D-1

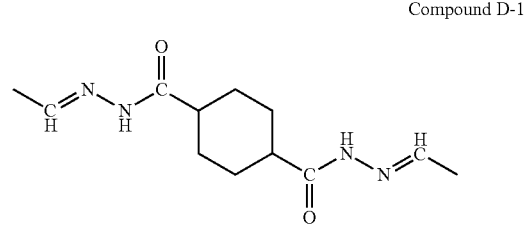

Compound D-2

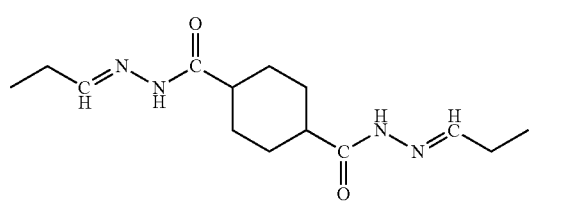

Compound D-3

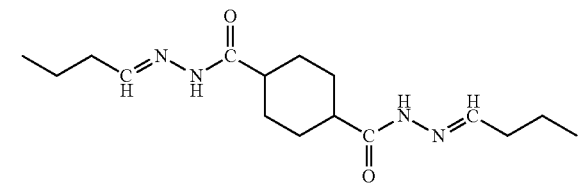

Compound D-4

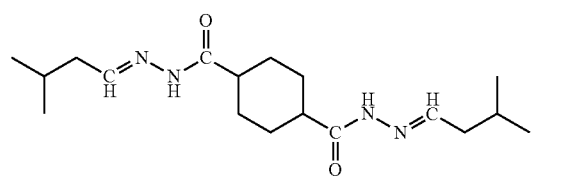

Compound D-5

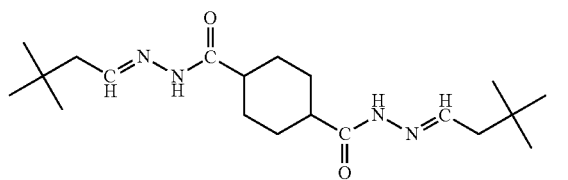

Compound D-6

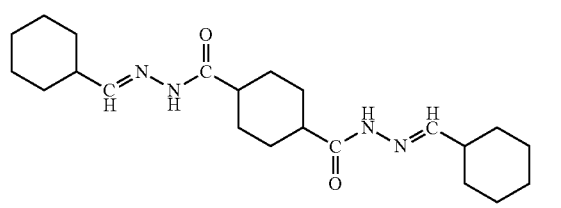

Compound D-7

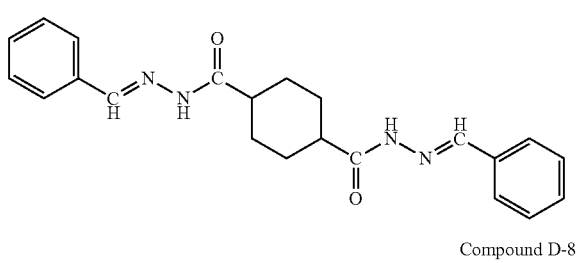

Compound D-8

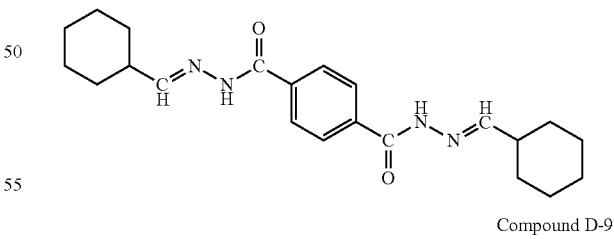

Compound D-9

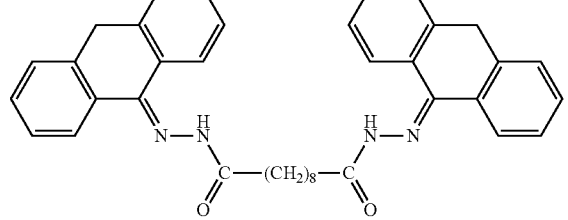

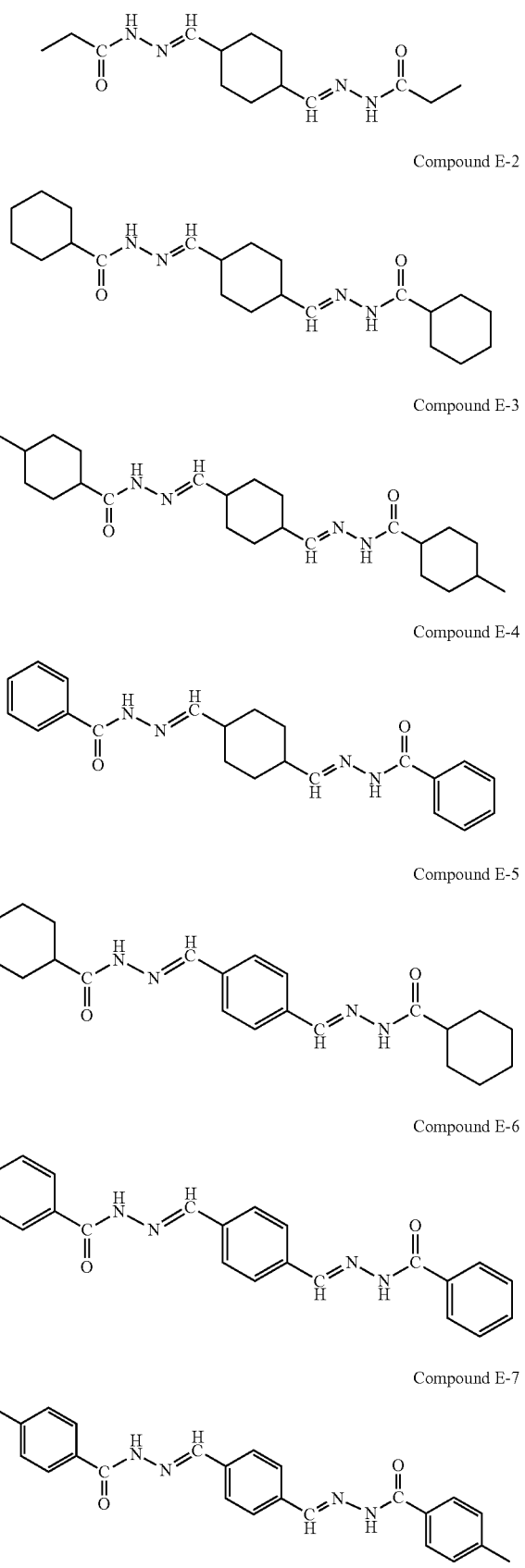

Compound E-1
Compound E-2
Compound E-3
Compound E-4
Compound E-5
Compound E-6
Compound E-7

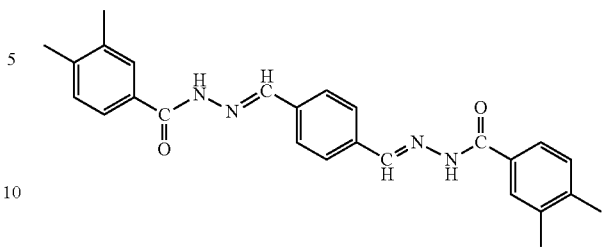

Compound E-8

Among the aforementioned crystal nucleating agents, a compound having a structure in which the $X^4$ in the above Formula (4) represents a 1,4-cyclohexylene group and a compound having a structure in which the $X^5$ in the above Formula (5) represents a 1,4-phenylene group may be particularly suitably used.

[Crystal Nucleating Agent (F)]

The crystal nucleating agent (F) according to the present invention is a naphthalene diamide compound represented by the following Formula (6):

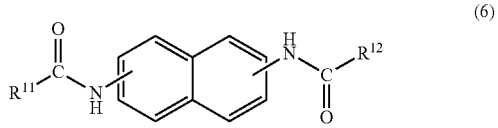

(6)

(wherein, $R^{11}$ and $R^{12}$ independently represent a $C_1$-$C_6$ alkyl group which is optionally branched).

Examples of the $C_1$-$C_6$ alkyl group which is optionally branched, which is represented by the $R^{11}$ and $R^{12}$ in the Formula (6) of the present invention, include groups such as methyl, ethyl, propyl, isopropyl, butyl, isobutyl, tert-butyl, pentyl, isopentyl, tert-pentyl, neopentyl, hexyl and isohexyl.

The position of the amide substituent in the Formula (6) of the present invention is not particularly restricted; however, a naphthalene diamide compound which is substituted at the 1- and 5-positions represented by the following Formula (12) or a naphthalene diamide compound which is substituted at the 1- and 8-positions represented by the following Formula (13) is preferred since the polyolefin-based resin has superior clearing effect.

Formula (12):

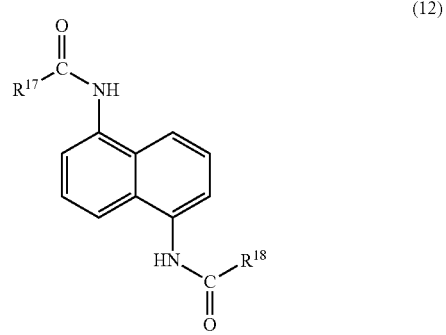

(12)

(wherein, $R^{17}$ and $R^{18}$ independently represent the same substituent as in the above Formula (6)).

Formula (13):

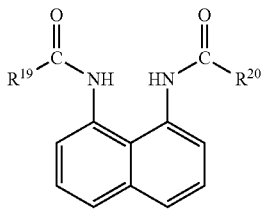

(13)

(wherein, $R^{19}$ and $R^{20}$ independently represent the same substituent as in the above Formula (6)).

More specific examples of the compound represented by the Formula (6) of the present invention include the following Compounds F-1 to F-7. However, the present invention is not restricted at all by the following compounds.

Compound F-1

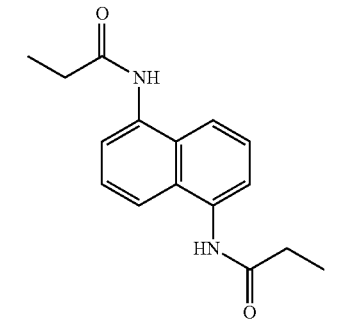

Compound F-2

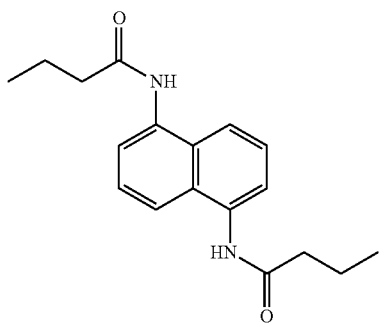

Compound F-3

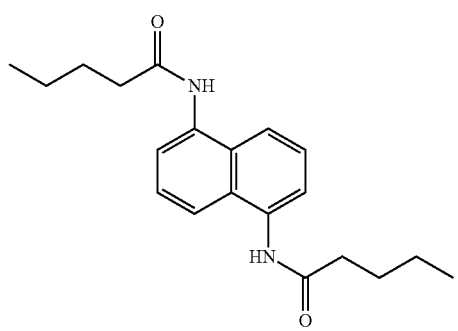

Compound F-4

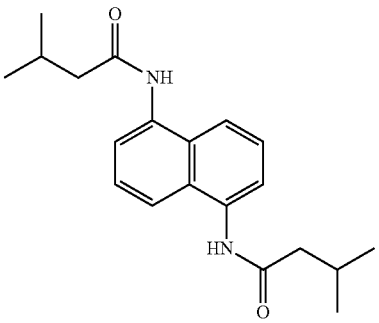

Compound F-5

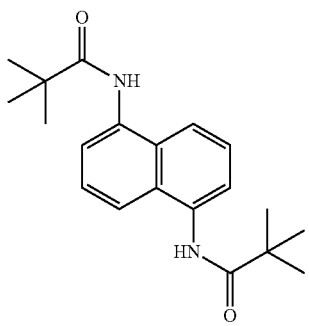

Compound F-6

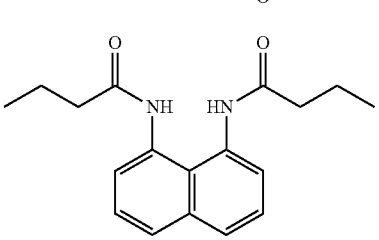

Compound F-7

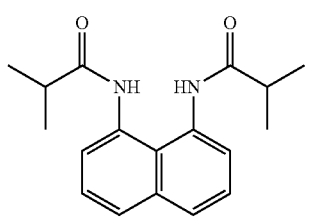

Next, the polyolefin-based resin composition according to the present invention will now be described in detail.

[Polyolefin-Based Resin]

Examples of the polyolefin-based resin according to the present invention include polyethylene resins, polypropylene resins and polybutene resins, for example, α-olefin polymers such as low-density polyethylenes, linear low-density polyethylenes, high-density polyethylenes, isotactic polypropylenes, syndiotactic polypropylenes, hemiisotactic polypropylenes, cycloolefin polymers, stereoblock polypropylenes, polybutene-1, poly-3-methyl-1-butene, poly-3-methyl-1-pentene and poly-4-methyl-1-pentene; and α-olefin copolymers such as ethylene/propylene block or random copolymers.

The aforementioned copolymers may be either a random copolymer or a block copolymer. When such resins have stereoregularity, they may be either isotactic or syndiotactic. Specific examples of such copolymers include α-olefins such as ethylene, propylene, butene, pentene, hexene, heptene, octene, nonene, decene, undecene and dodecene; (meta)acrylates such as 1,4-endo-methylene cyclohexene; and vinyl acetates.

Among the aforementioned polyolefin-based resins, a polypropylene-based resin which allows the crystal nucleating agent according to the present invention to exhibit prominent effects is suitable, and particularly suitably used is, for example, polypropylene, ethylene/propylene block or random copolymer, α-olefin other than ethylene/propylene block or random copolymer, and a mixture of one or more of these propylene-based polymer and other α-olefin polymer.

Further, a polyolefin-based resin having a melt flow rate within the range of 8 to 100 g/10 min is preferably used since it can well attain the effects of the present invention, and a polyolefin-based resin having a melt flow rate within the range of 8 to 60 g/10 min is particularly preferred.

It is noted here that, in addition to the polyolefin-based resins, a thermoplastic linear polyester-based macromolecular resin such as polyethylene terephthalate, polybutylene terephthalate or polyhexamethylene terephthalate; polyphenylene sulfide; an aliphatic polyester resin such as polylactone (polylactic acid) or polycaprolactone; a linear polyamide-based macromolecular resin such as polyhexamethylene adipamide; or a crystalline polystyrene-based macromolecular resin such as syndiotactic polystyrene may also be used. In the polyolefin-based resin composition according to the present invention, the aforementioned polyolefin-based resins may be mixed individually or in combination of two or more thereof, or a polymer alloy in which a polyolefin-based resin and a resin other than polyolefin-based resin are mixed within the range not adversely affecting the effects of the present invention may also be used.

In the polyolefin-based resin composition according to the present invention, the crystal nucleating agent which is selected from the group consisting of the crystal nucleating agents (A) to (F) each having a structure represented by one of the above Formulae (1) to (6) is added at an amount of 0.01 to 1 parts by mass, preferably at an amount of 0.03 to 0.5 parts by mass, with respect to 100 parts by mass of the aforementioned polyolefin-based resin. The effect of the addition is not sufficient at an amount less than 0.01 parts by mass, while at an amount greater than 1 part by mass, bleeding may occur on the surface of the molded article obtained by molding the polyolefin-based resin composition.

[Additives]

It is preferred that the polyolefin-based resin composition according to the present invention comprise, with respect to 100 parts by mass of the polyolefin-based resin, one or more selected from the group consisting of:

0.001 to 5 parts by mass of cyclic organic phosphoric acid ester metal salt compound represented by the following Formula (14):

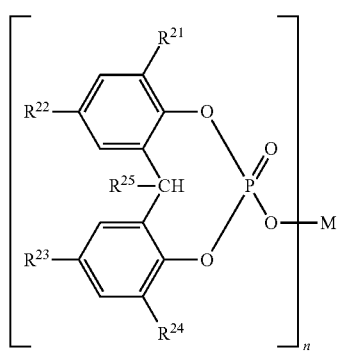

(wherein, $R^{21}$ to $R^{24}$ independently represent a hydrogen atom or a $C_1$-$C_9$ alkyl group which is optionally branched; $R^{25}$ represents a hydrogen atom or a methyl group; n represents 1 or 2; M represents an alkali metal when n is 1; and when n is 2, M represents Al(OH));

0.001 to 5 parts by mass of carboxylic acid alkali metal salt; and 0.001 to 5 parts by mass of diamide compound represented by the following Formula (15):

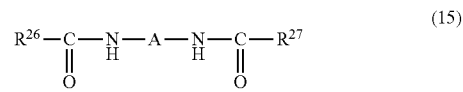

[wherein, $R^{26}$ and $R^{27}$ independently represent a hydrogen atom, a $C_1$-$C_{21}$ alkyl group which is optionally branched and/or is optionally substituted, a $C_3$-$C_{12}$ cycloalkyl group which is optionally substituted, a $C_6$-$C_{20}$ aryl group which is optionally substituted or a $C_6$-$C_{20}$ arylalkyl group which is optionally branched and/or is optionally substituted; and A represents a group represented by the following Formula (16):

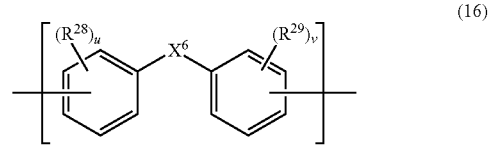

(wherein, $X^6$ represents a $C_1$-$C_5$ alkylene group which is optionally branched; $R^{28}$ and $R^{29}$ independently represent a halogen atom, a $C_1$-$C_4$ alkyl group which is optionally branched and/or is optionally substituted or a $C_1$-$C_4$ alkoxy group which is optionally branched and/or is optionally substituted; and u and v independently represent an integer of 0 to 4) or a group represented by the following Formula (17):

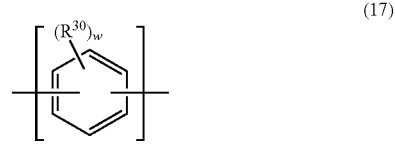

(wherein, $R^{30}$ represents a halogen atom, a $C_1$-$C_4$ alkyl group which is optionally branched and/or is optionally substituted or a $C_1$-$C_4$ alkoxy group which is optionally branched and/or is optionally substituted; and w represents an integer of 0 to 4)].

Examples of the $C_1$-$C_9$ alkyl group which is optionally branched, which is represented by the $R^{21}$ to $R^{24}$ in the Formula (14) of the present invention, include groups such as methyl, ethyl, propyl, isopropyl, butyl, isobutyl, tert-butyl, pentyl, isopentyl, tert-pentyl, neopentyl, hexyl, isohexyl, heptyl, octyl, 2-ethylhexyl and nonyl. Among these groups, it is preferred that the $R^{21}$ to $R^{24}$ be a tert-butyl group and that the $R^{25}$ be a hydrogen atom.

Examples of the alkali metal represented by the M in the Formula (14) of the present invention include lithium, sodium, potassium, rubidium and cesium, and preferred thereamong are lithium, sodium and potassium since these metals allow the polyolefin-based resin to have superior clearing effect.

More specific examples of the compound represented by the Formula (14) of the present invention include the following Compounds G-1 to G-5. However, the present invention is not restricted at all by the following compounds.

Compound G-1

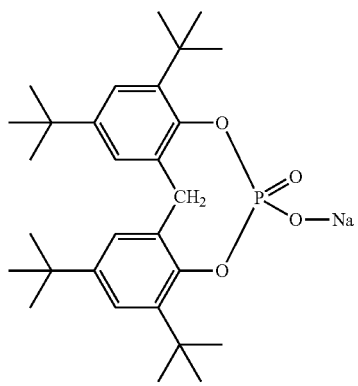

Compound G-2

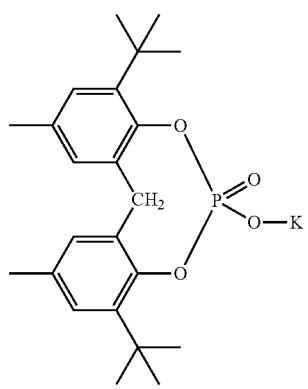

Compound G-3

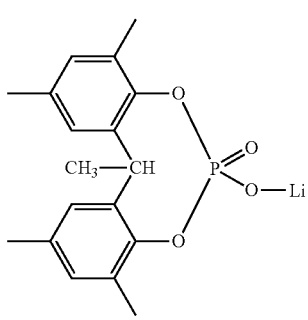

Compound G-4

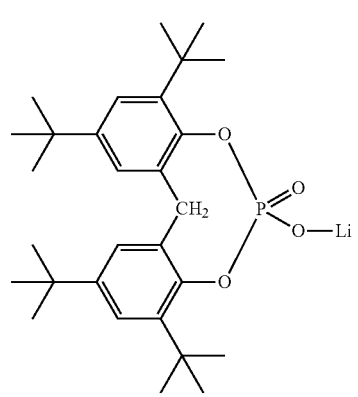

Compound G-5

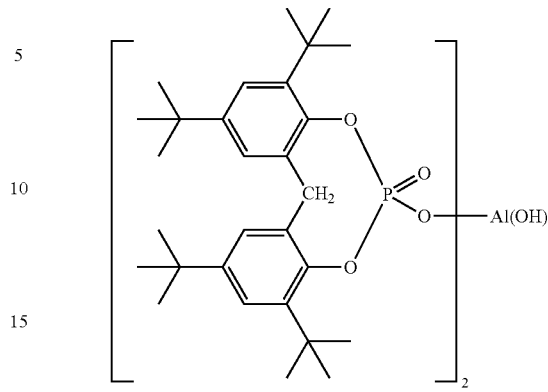

The cyclic organic phosphoric acid ester metal salt compound represented by the Formula (14) of the present invention is added at an amount of 0.001 to 5 parts by mass, preferably 0.005 to 3 parts by mass, more preferably 0.01 to 1 parts by mass, with respect to 100 parts by mass of the polyolefin-based resin. When the added amount is less than 0.001 parts by mass, the effect of the addition cannot be attained, and when the added amount exceeds 5 parts by mass, the physical properties of the polyolefin-based resin may be rather deteriorated; therefore, such added amounts are not preferred.

Examples of the alkali metal constituting the carboxylic acid alkali metal salt according to the present invention include the same metals exemplified for the M in the above Formula (14). Among such metals, lithium, sodium and potassium are preferred, and lithium is particularly preferred since it allows the polyolefin-based resin to have superior clearing effect.

Examples of the carboxylic acid constituting the aforementioned carboxylic acid alkali metal salt include aliphatic monocarboxylic acids such as acetic acid, propionic acid, acrylic acid, octylic acid, isooctylic acid, nonanoic acid, decanoic acid, lauric acid, myristic acid, palmitic acid, stearic acid, oleic acid, recinoleic acid, 12-hydroxy stearic acid, behenic acid, montanoic acid, melissic acid, β-dodecylmercapto acetic acid, β-dodecylmercaptopropionate, β-laurylaminopropionate and β-N-methyl-N-lauroylaminopropionate; aliphatic polycarboxylic acids such as malonic acid, succinic acid, adipic acid, maleic acid, azelaic acid, sebacic acid, dodecanedioic acid, citric acid, butane tricarboxylic acid and butane tetracarboxylic acid; alicyclic mono- or polycarboxylic acids such as naphthenic acid, cyclopentane carboxylic acid, 1-methylcyclopentane carboxylic acid, 2-methylcyclopentane carboxylic acid, cyclopentene carboxylic acid, cyclohexane carboxylic acid, 1-methylcyclohexane carboxylic acid, 4-methylcyclohexane carboxylic acid, 3,5-dimethylcyclohexane carboxylic acid, 4-butylcyclohexane carboxylic acid, 4-octylcyclohexane carboxylic acid, cyclohexene carboxylic acid and 4-cyclohexene-1,2-dicarboxylic acid; and aromatic mono- or poly-carboxylic acids such as benzoic acid, toluic acid, xylic acid, ethylbenzoate, 4-tert-butylbenzoate, salicylic acid, phthalic acid, trimellitic acid and pyromellitic acid. Preferred thereamong are aliphatic monocarboxylic acids such as octylic acid, lauric acid, myristic acid, palmitic acid, stearic acid, oleic acid, 12-hydroxy stearic acid, behenic acid and montanoic acid since these acids allow the polyolefin-based resin to have superior clearing effect, and particularly preferred are myristic acid, palmitic acid, stearic acid and 12-hydroxy stearic acid.

The carboxylic acid alkali metal salt according to the present invention is added at an amount of 0.001 to 5 parts by mass, preferably 0.005 to 3 parts by mass, more preferably 0.01 to 1 parts by mass, with respect to 100 parts by mass of the polyolefin-based resin. When the added amount is less than 0.001 parts by mass, the effect of the addition cannot be attained, and when the added amount exceeds 5 parts by mass, the physical properties of the polyolefin-based resin may be rather deteriorated; therefore, such added amounts are not preferred.

Examples of the $C_1$-$C_{21}$ alkyl group represented by the $R^{26}$ and $R^{27}$ in the Formula (15) of the present invention include groups such as methyl, ethyl, propyl, isopropyl, butyl, sec-butyl, tert-butyl, isobutyl, amyl, isoamyl, tert-amyl, hexyl, 2-hexyl, 3-hexyl, heptyl, 2-heptyl, 3-heptyl, isoheptyl, tert-heptyl, n-octyl, isooctyl, tert-octyl, 2-ethylhexyl, nonyl, isononyl, decyl(lauryl), undecyl, tridecyl, tetradecyl(myristyl), pentadecyl, hexadecyl(palmityl), heptadecyl, octadecyl (stearyl), eicosyl and heneicosyl. In these alkyl groups, —$CH_2$— is optionally substituted by a hydroxy group, halogen atom, cyano group, nitro group, $C_1$-$C_{18}$ alkyl group or alkoxy group and/or is optionally interrupted by an oxygen atom, sulfur atom, carbonyl group, ester group, amide group or imino group. Such substitution(s) and interruption(s) may also exist in combination.

Examples of the $C_3$-$C_{12}$ cycloalkyl group represented by the $R^{26}$ and $R^{27}$ in the Formula (15) of the present invention include saturated carbocyclic groups such as cyclopropyl, cyclopentyl, cyclohexyl, cycloheptyl, cyclooctyl, cyclononyl, cyclodecyl and cyclododecyl, and in these saturated carbocyclic groups, the hydrogen atom(s) is/are optionally substituted by a hydroxy group, halogen atom, cyano group, nitro group, $C_1$-$C_{18}$ alkyl group or alkoxy group and/or is/are optionally interrupted by an oxygen atom, sulfur atom, carbonyl group, ester group, amide group or imino group. Such substitution(s) and interruption(s) may also exist in combination.

Examples of the $C_6$-$C_{20}$ aryl group represented by the $R^{26}$ and $R^{27}$ in the Formula (15) of the present invention include aromatic ring groups such as phenyl, 3,4,5-trimethoxyphenyl, 4-tert-butylphenyl, biphenyl, naphthyl, anthryl and phenanthryl, and in these aromatic ring groups, the hydrogen atom(s) is/are optionally substituted by a hydroxy group, halogen atom, cyano group, nitro group, $C_1$-$C_{18}$ alkyl group or alkoxy group and/or is/are optionally interrupted by an oxygen atom, sulfur atom, carbonyl group, ester group, amide group or imino group. Such substitution(s) and interruption(s) may also exist in combination.

Examples of the $C_1$-$C_5$ alkylene group which is optionally branched, which is represented by the $X^6$ in the Formula (16) of the present invention include groups such as methylene, ethylene, propylene, butylene, isobutylene and pentylene, and in these alkylene groups, —$CH_2$— is optionally substituted by a hydroxy group, halogen atom, cyano group, nitro group, $C_1$-$C_{18}$ alkyl group or alkoxy group and/or is optionally interrupted by an oxygen atom, sulfur atom, carbonyl group, ester group, amide group or imino group. Such substitution(s) and interruption(s) may also exist in combination.

Examples of the $C_1$-$C_4$ alkyl group which is optionally branched and/or is optionally substituted, which is represented by the $R^{28}$ and $R^{29}$ in the above Formula (16), include groups such as methyl, ethyl, propyl, isopropyl, butyl, sec-butyl, tert-butyl and isobutyl, and in these alkyl groups, the hydrogen atom(s) is/are optionally substituted by a hydroxy group, halogen atom, cyano group, nitro group, $C_1$-$C_{18}$ alkyl group or alkoxy group and/or is/are optionally interrupted by an oxygen atom, sulfur atom, carbonyl group, ester group, amide group or imino group. Such substitution(s) and interruption(s) may also exist in combination. In addition, in cases where there is a plurality of each of the $R^{28}$ and $R^{29}$, each thereof may be a different substituent.

Examples of the $C_1$-$C_4$ alkoxy group which is optionally branched and/or is optionally substituted, which is represented by the $R^{28}$ and $R^{29}$ in the above Formula (16), include groups such as methoxy, ethoxy, propoxy, isopropoxy and butoxy, and these alkoxy groups are optionally substituted or interrupted by an oxygen atom, sulfur atom, carbonyl group, ester group, amide group or imino group. Such substitution(s) and interruption(s) may also exist in combination.

Examples of the $C_1$-$C_4$ alkyl group which is optionally branched and/or is optionally substituted, which is represented by the $R^{30}$ in the Formula (17) of the present invention, include the same groups as those exemplified for the aforementioned $R^{28}$ and $R^{29}$.

More specific examples of the compound represented by the Formula (15) of the present invention include the following Compounds H-1 to H-14. However, the present invention is not restricted at all by the following compounds.

Compound H-1

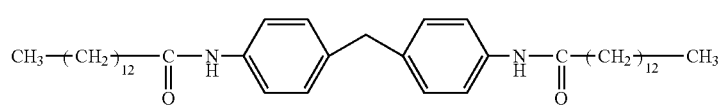

Compound H-2

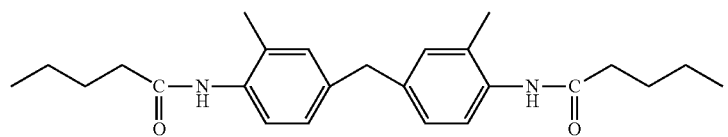

Compound H-3

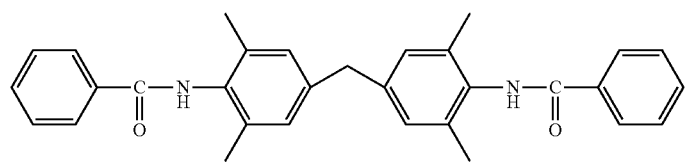

Compound H-4
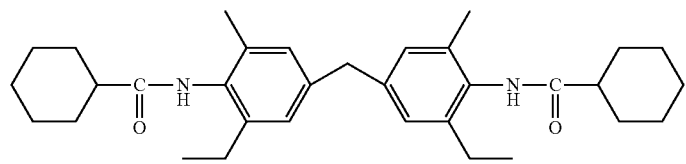
Compound H-5
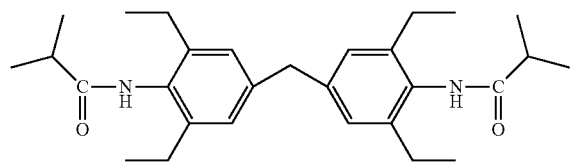
Compound H-6
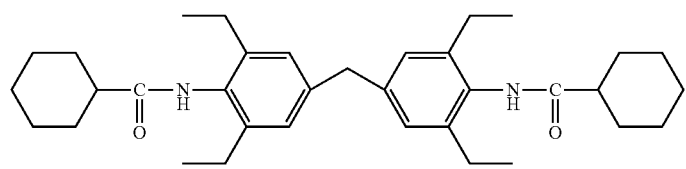
Compound H-7
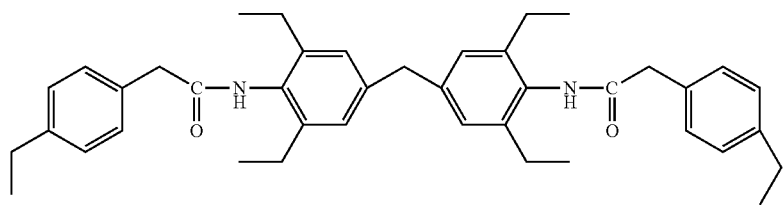
Compound H-8
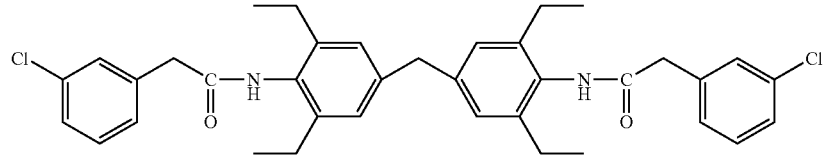
Compound H-9
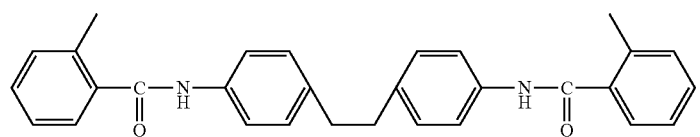
Compound H-10
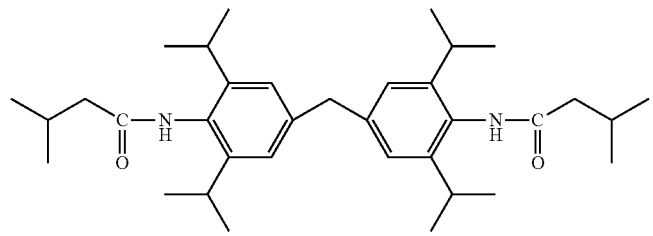
Compound H-11
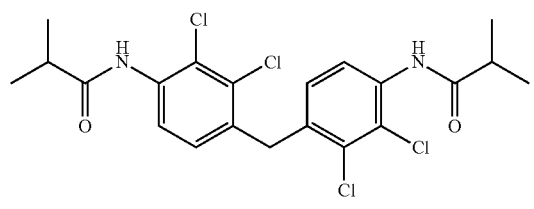
Compound H-12
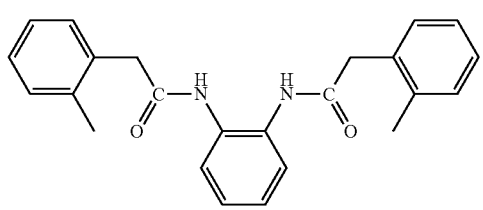

Compound H-13

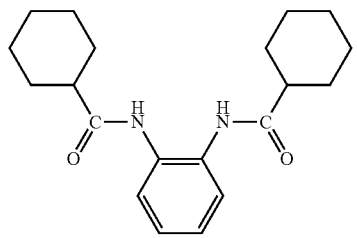

Compound H-14

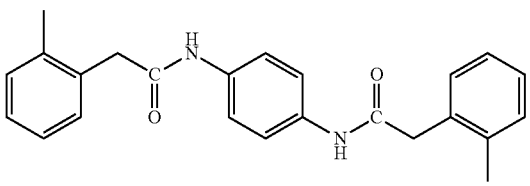

The diamide compound represented by the Formula (15) of the present invention is added at an amount of 0.001 to 5 parts by mass, preferably 0.005 to 3 parts by mass, more preferably 0.01 to 1 parts by mass, with respect to 100 parts by mass of the polyolefin-based resin. When the added amount is less than 0.001 parts by mass, the effect of the addition cannot be attained, and when the added amount exceeds 5 parts by mass, the physical properties of the polyolefin-based resin may be rather deteriorated; therefore, such added amounts are not preferred.

In the polyolefin-based resin composition according to the present invention, the compounding ratio of the at least one crystal nucleating agent (Component (a)) selected from the group consisting of the crystal nucleating agents (A) to (F) having the structure represented by the Formulae (1) to (6); the cyclic organic phosphoric acid ester metal salt compound (Component (b)); the carboxylic acid alkali metal salt (Component (c)); and diamide compound (Component (d)) is not particularly restricted; however, particularly, it is preferred that the carboxylic acid alkali metal salt (Component (c)) be added at an amount not less than an equal equivalent of the cyclic organic phosphoric acid ester metal salt compound (Component (b)) since such an amount allows the polyolefin-based resin to exhibit prominent clearing effect.

[Neutralizing Agent]

In the polyolefin-based resin composition according to the present invention, in order to neutralize residual catalyst in the polyolefin-based resin, it is preferred that a known neutralizing agent be added. Examples of the neutralizing agent include fatty acid metal salts and fatty acid amide compounds. As the fatty acid metal salt or fatty acid amide compound, for example, lithium stearate, calcium stearate, sodium stearate, ethylenebisstearoamide, ethylenebis(12-hydroxystearoamide) and stearic acid amide may be suitably used. As the neutralizing agent, it is preferred that the fatty acid metal salt or fatty acid amide compound be added at an amount of 0.01 to 1 parts by mass with respect 100 parts by mass of the polyolefin-based resin.

[Other Additives]

Further, in the polyolefin-based resin composition according to the present invention, other additive(s) conventionally used may be added as required within the range not inhibiting the effects of the present invention. As the other additive(s), plasticizers such as epoxy compounds of a neopentyl glycol derivative, polyalkylene glycol or a derivative thereof or polyalcohol or a derivative thereof; antioxidants including phenol-based, phosphorus-based and sulfur-based antioxidants; light-stabilizing agents including hindered amine-based light-stabilizing agents and UV absorbers; lubricants such as hydrocarbon-based compounds, fatty acid-based compounds, aliphatic alcohol-based compounds, aliphatic ester-based compounds, aliphatic amide-based compounds, aliphatic carboxylic acid metal salt compounds and other metallic soaps; heavy metal inactivators; antistatic agents including cationic surfactants, anionic surfactants, nonionic surfactants and ampholytic surfactants; nucleating agents; flame retardants; fillers such as glass fibers and calcium carbonates; silicate-based inorganic additives such as hydrotalcite, fumed silica, fine-particle silica, silica rock, diatomites, clay, kaolin, diatomaceous earth, silica gel, calcium silicate, sericite, kaolinite, flint, feldspar powder, vermiculite, attapulgite, talc, mica, minnesotite, pyrophyllite and silica; coloring agents; pigments; anti-clouding agents; various fillers; mold releasing agents; flavoring agents; foaming agents; antimicrobial agents; and antifungal agents may be used. Particularly, phenol-based and phosphorous-based antioxidants are preferably used since they have an effect as anti-coloring agent for the polyolefin-based resin composition.

Examples of the aforementioned phenol-based antioxidant include 2,6-di-tert-butyl-p-cresol, 2,6-diphenyl-4-octadesiloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylenebis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butylic acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl) propionate]methane, 2-tert-butyl-4-methyl-6-(2-acroyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane and triethylene glycolbis[β-(3-tert-butyl-4-hydroxy-5-methylphenyl)propionate]. The aforementioned phenol-based antioxidant is used at an amount of 0.001 to 10 parts by mass, preferably 0.01 to 5 parts by mass, with respect to 100 parts by mass of the aforementioned polyolefin-based resin.

Examples of the aforementioned phosphorus-based antioxidant include triphenyl phosphite, tris(2,4-di-tert-butylphenyl)phosphite, tris(2,5-di-tert-butylphenyl)phosphite, tris(nonylphenyl)phosphite, tris(dinonylphenyl)phosphite, tris(mono-, di-mixed nonylphenyl)phosphite, diphenyl acid phosphite, 2,2'-methylenebis(4,6-di-tert-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentylglycol)-1,4-cyclohexanedimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra ($C_{12-15}$ mixed alkyl)-4,4'-isopropylidenediphenyl phosphite, bis[2,2'-methylenebis(4,6-diamylphenyl)]-isopropylidenediphenyl phosphite, tetramidecyl-4,4'-butylidenebis(2-tert-butyl-5-methylphenol)diphosphite, hexa(tridecyl)-1,1,3-tris(2-methyl-5-tert-butyl-4-hydroxyphenyl)butane triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepin-6-yl)oxy]ethyl)amine, 9,10-dihydro-9-oxa-10-phosphaphenanthrene-10-oxide and 2-butyl-2-ethylpropanediol-2,4,6-tri-tert-butylphenol monophosphite. The aforementioned phosphorus-based antioxidant is used at an amount of 0.001 to 10 parts by mass, preferably 0.01 to 5 parts by mass, with respect to 100 parts by mass of the aforementioned polyolefin-based resin.

Examples of the aforementioned sulfur-based antioxidant include dialkyl thiodipropionates such as dilauryls, dimyristyls, myristylstearyls and distearylesters of thiodipropionic acid; and β-alkylmercaptopropionic acid esters of polyols such as pentaerythritol tetra(β-dodecylmercaptopropionate). The aforementioned sulfur-based antioxidant is used at an amount of 0.001 to 10 parts by mass, preferably 0.01 to 5 parts by mass, with respect to 100 parts by mass of the aforementioned polyolefin-based resin.

Examples of the aforementioned hindered amine-based light-stabilizing agent include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidyl methacrylate, 2,2,6,6-tetramethyl-piperidyl methacrylate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-bis(tridecyl)-1,2,3,4-butanetetracarboxylate, bis(1,2,2,6,6-pentamethyl-4-piperidyl)-bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, 1,6,11-tris[2,4-bis(N-butyl-N-(1,2,2,6,6-pentamethyl-4-piperidyl)amino)-s-triazine-6-ylamino]undecane, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, bis(1-octyloxy-2,2,6,6-tetramethyl-4-piperidyl)decanedioate, bis(2,2,6,6-tetramethyl-4-undecyloxypiperidyl)carbonate and TINUVIN NOR 371 manufactured by Ciba Specialty Chemicals Corporation. The aforementioned hindered amine-based light-stabilizing agent is used at an amount of 0.001 to 10 parts by mass, preferably 0.01 to 5 parts by mass, with respect to 100 parts by mass of the aforementioned polyolefin-based resin.

Examples of the aforementioned UV absorber include 2-hydroxybenzophenones such as 2,4-dihydroxybenzophenone, 2-hydroxy-4-methoxybenzophenone, 2-hydroxy-4-octoxy benzophenone and 5,5'-methylenebis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazorylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-$C_{12-13}$ mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl(3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate; and various metal salts and metal chelates, particularly salts and chelates of nickel and chromium. The aforementioned UV absorber is used at an amount of 0.001 to 10 parts by mass, preferably 0.01 to 5 parts by mass, with respect to 100 parts by mass of the aforementioned polyolefin-based resin.

Examples of the aliphatic amide-based compound used as the aforementioned lubricant include mono-fatty acid amides such as lauric acid amide, stearic acid amide, oleic acid amide, erucic acid amide, ricinoleic acid amide and 12-hydroxy stearic acid amide; N,N'-bis-fatty acid amides such as N,N'-ethylenebis lauric acid amide, N,N'-methylenebis stearic acid amide, N,N'-ethylenebis stearic acid amide, N,N'-ethylenebis oleic acid amide, N,N'-ethylenebis behenic acid amide, N,N'-ethylenebis-12-hydroxy stearic acid amide, N,N'-butylenebis stearic acid amide, N,N'-hexamethylenebis stearic acid amide, N,N'-hexamethylenebis oleic acid amide and N,N'-xylylenebis stearic acid amide; alkylol amides such as stearic acid monomethylol amide, coconut oil fatty acid monoethanol amide and stearic acid diethanol amide; N-substituted fatty acid amides such as N-oleyl stearic acid amide, N-oleyl oleic acid amide, N-stearyl stearic acid amide, N-stearyl oleic acid amide, N-oleyl palmitic acid amide and N-stearyl erucic acid amide; and N,N'-substituted dicarboxylic acid amides such as N,N'-dioleyl adipic acid amide, N,N'-distearyl adipic acid amide, N,N'-dioleyl sebacic acid amide, N,N'-distearyl sebacic acid amide, N,N'-distearyl terephthalic acid amide and N,N'-distearyl isophthalic acid amide. These may be used individually or two or more thereof may be used as a mixture. The aforementioned lubricant is used preferably at an amount of 0.01 to 30 parts by mass, more preferably at an amount of 0.1 to 20 parts by mass, with respect to 100 parts by mass of the aforementioned polyolefin-based resin.

Examples of the aforementioned nucleating agent include metal carboxylates such as sodium benzoate, aluminum 4-tert-butyl benzoate, sodium adipate and 2-sodium-bicyclo[2.2.1]heptane-2,3-dicarboxylate; metal phosphates such as sodium-bis(4-tert-butylphenyl)phosphate, sodium-2,2'-methylenebis(4,6-di-tert-butylphenyl)phosphate and lithium-2,2'-methylenebis(4,6-di-tert-butylphenyl)phosphate; polyalcohol derivatives such as dibenzylidene sorbitol, bis(methylbenzylidene)sorbitol, bis(p-ethylbenzylidene)sorbitol and bis(dimethylbenzylidene)sorbitol; and amide compounds such as N,N',N''-tris[2-methylcyclohexyl]-1,2,3-propane tricarboxyamide, N,N',N''-tricyclohexyl-1,3,5-benzene tricarboxyamide, N,N'-dicyclohexyl-naphthalene dicarboxyamide and 1,3,5-tri(dimethylisopropoylamino)benzene. The aforementioned nucleating agent is used at an amount of 0.001 to 10 parts by mass, more preferably 0.005 to 5 parts by mass, with respect to 100 parts by mass of the aforementioned polyolefin-based resin.

Examples of the aforementioned flame retardant include aromatic phosphates such as triphenyl phosphate, tricresyl phosphate, trixylenyl phosphate, cresyldiphenyl phosphate, cresyl-2,6-xylenyl phosphate and resorcinol bis(diphenylphosphate); phosphates such as divinyl phenyl phosphate, diallylphenyl phosphate and phenyl phosphate(1-butenyl); phosphinic acid esters such as diphenyl phosphinic acid phenyl, diphenyl phosphinic acid methyl and 9,10-dihydro-9-oxa-10-phosphaphenanthlene-10-oxide derivative; phosphazene compounds such as bis(2-allylphenoxy)phosphazene and dicresylphosphazene; phosphorus-based flame retardants such as melamine phosphate, melamine pyrophosphate, melamine polyphosphate, melam polyphosphate, ammonium polyphosphate, phosphorous-containing vinylbenzyl compounds and red phosphorus; metal hydroxides such as magnesium hydroxides and aluminium hydroxides; and bromine-based flame retardants such as brominated bisphenol Type A epoxy resin, brominated phenol novolac-type epoxy resin, hexabromobenzene, pentabromotoluene, ethylenebis(pentabromophenyl), ethylenebis tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromo bisphenol A dimethacrylate, pentabromobenzyl acrylate and brominated styrene. The aforementioned flame retardant is used at an amount of 1 to 50 parts by mass, more preferably 1 to 20 parts by mass, with respect to 100 parts by mass of the aforementioned polyolefin-based resin.

[Preparation Method]

In the polyolefin-based resin composition according to the present invention, the method of blending the crystal nucleating agent according to the present invention and the above-described additive(s) to the aforementioned polyolefin-based resin is not particularly restricted, and a conventionally known method may be employed. For example, the polyolefin-based resin in the form of powder or pellet and the additive(s) may be mixed by dry blending, or the polyolefin-based resin may be pre-blended with a portion of the additive(s), followed by dry blending with remaining components. After the dry blending, for example, mixing may also be carried out by using a mill roll, Banbury mixer, super mixer or the like, followed by kneading of the resulting mixture by a uniaxial or biaxial extruder or the like. The mixing and kneading are usually carried out at a temperature of approximately 120° C. to 220° C. In addition, for example, a method in which the additive(s) is/are added at the polymerization step of the polyolefin-based resin; a method in which, after mixing the additive(s) in advance with a granulation-assisting agent or the like, such as a binder, wax, solvent or silica, at a desired ratio, the resulting mixture is made into a one-pack composite additive which is then added to the polyolefin-based resin; or a method in which a master batch containing the additive(s) at a high concentration is produced, which is then added to the polyolefin-based resin, may be employed.

When molding the polyolefin-based resin composition according to the present invention, the molding may be carried out in the same manner as in ordinary plastics by extrusion molding, injection molding, blow molding, vacuum molding, compression molding or the like, and therefore, a variety of molded articles such as fibers, biaxially-oriented films, sheets, bars, bottles and containers may be easily obtained. Particularly, the polyolefin-based resin composition according to the present invention is suitable for those applications in which various post-treatments are performed, and it is used in, for examples, those applications in which sterilization is performed by radiation, high-pressure steam or the like, including medical supplies such as injectors and infusion solution bags, food packaging products in the form of films, sheets or various molded articles or the like; or those applications in which a low-temperature plasma treatment or the like is performed after molding in order to improve the surface characteristics such as coating property. Examples of the aforementioned food packaging products include food containers, frozen desert containers, trays, ready-to-eat food containers and margarine containers, and examples of the aforementioned medical supplies include injector syringes, spit tubes, infusion solution containers and cylinders. Examples of the injector syringes include drug solution-filled syringes and syringes not filled with a drug solution, such as disposable syringes. Further, a fiber-reinforced plastic may be produced by blending a glass fiber, carbon fiber or the like to the polyolefin-based resin composition according to the present invention. The aforementioned molding is affected by the melt viscosity of the resin, and the molding temperature is preferably within the range of 180 to 230° C., particularly preferably within the range of 190 to 220° C. At a temperature lower than 180° C., the polyolefin-based resin itself may not be sufficiently melted and irregularities may occur on the resulting molded articles, and at a temperature not lower than 230° C., the effects of the present invention may not be attained.

EXAMPLE

The present invention will now be described more specifically by way of Synthesis Examples, Production Examples and Examples; however, the present invention is not restricted thereto by any means. Here, the Synthesis Examples refer to methods of synthesizing the crystal nucleating agent according to the present invention, and the Production Examples are production examples of the polyolefin-based resin composition according to the present invention. Further, shown by the Examples are evaluations on the physical properties of the polyolefin-based resin composition according to the present invention.

Example A

Synthesis Example A

The Compound A-1 was synthesized in accordance with the following procedure.

Under a nitrogen atmosphere, 3 g (24.6 mmol) of erythritol, 0.3 g of dibutyltin oxide and 150 ml of dimethylacetamide were mixed and cooled to 0° C. After the cooling, 12.3 g (98.4 mmol) of cyclohexyl isocyanate was further added dropwise. Thereafter, the resultant was heated to 140° C. and retained at the temperature for 4 hours. After allowing the mixture to cool at room temperature, 100 ml of mixed solution of isopropanol and water (mass ratio of 1:1) was added to stop the reaction. The product generated by the reaction was separated by filtration, and the residue was washed with isopropanol to obtain 12.7 g of white solid (Yield: 83%). The thus obtained white solid was analyzed by FT-IR and identified to be the Compound A-1. The analytical results are shown below.

FT-IR [KBr pellet method] ($cm^{-1}$)
3329, 2936, 2855, 1693, 1535, 1447, 1315, 1280, 1234, 1146, 1068, 1049

Production Example A

With respect to 100 parts by mass of ethylene/propylene random copolymer (ethylene content; 3% by mass) having a melt flow index of 15 g/10 min at 230° C. and 21.2N, 0.1 parts by mass of phenol-based antioxidant (tetrakis[methylene-3-(3',5'-di-tert-butyl-4'-hydroxyphenyl)propionate]methane), 0.1 parts by mass of phosphorous-based antioxidant (tris(2,4-di-tert-butylphenyl)phosphite), 0.05 parts by mass of hydrotalcite (DHT-4A; manufactured by Kyowa Chemical Industry Co., Ltd.) and the compound shown in Table 1 below were mixed for 1 minute using a Henschel mixer (FM200; manufactured by Mitsui Mining Co., Ltd.) at 1,000 rpm. The thus obtained mixture was extruded using a uniaxial extruder (OEX3024; manufactured by DDM Co., Ltd.) under processing conditions of a temperature at 230° C. and a screw speed at 25 rpm to produce a pellet. The thus obtained pellets were dried at 90° C. for 3 hours, and the following evaluations were carried out. It is noted here that the crystal nucleating agents shown in Table 1 below correspond to the aforementioned Compounds A-1 to A-4 and A-7.

(Crystallization Temperature)

The thus obtained pellets were heated to 230° C. at a rate of 50° C./min using a differential scanning calorimeter (Diamond; manufactured by PerkinElmer, Inc.) and after maintaining them for 10 minutes, the pellets were cooled to 50° C. at a rate of −10° C./min to obtain charts. In the thus obtained respective charts, the endothermic peak top was regarded as the crystallization temperature. The results are shown in Table 1 below.

(Haze)

Using an injection molding machine (EC100-2A; manufactured by Toshiba Machine Co., Ltd.), the above-obtained pellets were each filled into a die at an injection temperature of 220° C. and an injection pressure of 70 to 80 MPa for 40 seconds, and cooled in the die at 50° C. for 20 seconds. Thereafter, under conditions for removal of a sheet from the die, injection molding was carried out to obtain a square sheet of 60 mm×60 mm having a thickness of 1 mm. Immediately after the injection molding, the thus obtained sheet was left to stand for not less than 48 hours in an incubator having an inner temperature of 23° C., and the Haze (transparency) of the test piece was then determined using Haze Guard 2 (manufactured by Toyo Seiki Seisaku-sho Ltd.). A smaller value indicates a better transparency of the test piece. The results are shown in Table 1 below.

(Bending Modulus)

Using an injection molding machine (EC100-2A; manufactured by Toshiba Machine Co., Ltd.), the above-obtained pellets were each filled into a die at an injection temperature of 220° C. and an injection pressure of 70 to 80 MPa for 40 seconds, and cooled in the die at 50° C. for 20 seconds. Thereafter, under conditions for removal of a sheet from the die, injection molding was carried out to prepare a bending test piece having a dimension of 80 mm in length, 10 mm in width and 4 mm in thickness. Immediately after the injection molding, the thus obtained bending test piece was left to stand for not less than 48 hours in an incubator having an inner temperature of 23° C., and the bending modulus (MPa) was then determined using a bending tester (manufactured by Shimazu Corporation; AG-IS). The results are shown in Table 1 below.

TABLE 1

|  | Example A-1 | Example A-2 | Example A-3 | Example A-4 | Example A-5 | Comparative Example A-1 |
| --- | --- | --- | --- | --- | --- | --- |
| Crystal Nucleating Agent | Compound A-1 | Compound A-4 | Compound A-7 | Compound A-2 | Compound A-3 | Control[1] |
| Crystallization Temperature [° C.] | 118 | 116 | 118 | 119 | 115 | 104 |
| Haze [%] | 16.3 | 25.4 | 25.8 | —[2] | —[2] | 44.1 |
| Bending Modulus [MPa] | 1240 | 1180 | 1380 | —[2] | —[2] | 1080 |

[1]Without crystal nucleating agent
[2]Not Determined

From the above Table 1, it was confirmed that the polyolefin-based resin compositions containing the crystal nucleating agent represented by the Formula (1) of the present invention can drastically improve the transparency and physical properties.

Example B

Synthesis Example B

The Compounds B-1 to B-3, B-7 and B-9 were synthesized in accordance with the following procedure. It is noted here that the Compounds B-1 to B-3, B-7 and B-9 indicate the aforementioned crystal nucleating agents.

Synthesis Example B-1

Under a nitrogen atmosphere, 6.2 g (0.02 mol) of 4,4'-methylenebis(2,6-diethylaniline), 50 g of dimethylacetamide, 3.2 g (0.04 mol) of pyridine, 6.0 g (0.04 mol) of o-toluoyl acetate and 12.4 g (0.04 mol) of triphenyl phosphate were stirred at 80° C. for 4 hours to allow the mixture to react. After completion of the reaction, distilled water was added and the resulting mixture was further stirred at 80° C. for 30 minutes, and the mixture was allowed to cool at room temperature. Thereafter, the resulting precipitates were separated by filtration under a reduced pressure, and the residue was re-precipitated by isopropanol. The thus re-precipitated precipitates were separated by filtration to obtain 10.7 g of white solid (Yield: 93%). The thus obtained white solid was analyzed by FT-IR and identified to be the desired Compound B-1. The analytical results are shown below.

FT-IR [KBr pellet method] $(cm^{-1})$ 741, 1520, 1655, 2963, 3252

Synthesis Example B-2

The compound B-2 (9.7 g; Yield: 85%) was synthesized in the same manner as in the aforementioned Synthesis Example B-1 except that 6.0 g (0.04 mol) of m-toluoyl acetate was used in place of 6.0 g (0.04 mol) of o-toluoyl acetate.

Synthesis Example B-3

The compound B-3 (10.3 g; Yield: 90%) was synthesized in the same manner as in the aforementioned Synthesis Example B-1 except that 6.0 g (0.04 mol) of p-toluoyl acetate was used in place of 6.0 g (0.04 mol) of o-toluoyl acetate.

Synthesis Example B-4

The compound B-7 (9.9 g; Yield: 80%) was synthesized in the same manner as in the aforementioned Synthesis Example B-1 except that 5.4 g (0.04 mol) of 1-chloro-2-benzene ethanoic acid was used in place of 6.0 g (0.04 mol) of o-tolyl acetate.

Synthesis Example B-5

The compound B-9 (8.1 g; Yield: 90%) was synthesized in the same manner as in the aforementioned Synthesis Example B-1 except that 4.2 g (0.02 mol) of 2,2-ethylenebis-dianiline was used in place of 6.21 g (0.02 mol) of 4,4'-methylenebis(2,6-diethylaniline).

Production Example B

With respect to 100 parts by mass of ethylene/propylene random copolymer (ethylene content; 3% by mass) having a melt flow rate of 10 g/10 min at 230° C. and 21.2N, 0.1 parts by mass phenol-based antioxidant (tetrakis[methylene-3-(3', 5'-di-tert-butyl-4'-hydroxyphenyl)propionate]methane), 0.1 parts by mass of phosphorous-based antioxidant (tris(2,4-di-tert-butylphenyl)phosphite), 0.05 parts by mass of calcium stearate and the crystal nucleating agent shown in Table 2 below were mixed for 1 minute using a Henschel mixer (FM200; manufactured by Mitsui Mining Co., Ltd.) at 1,000 rpm. The thus obtained mixture was extruded using a uniaxial extruder (OEX3024; manufactured by DDM Co., Ltd.) under processing conditions of a temperature at 240° C. and a screw speed at 30 rpm to produce a pellet. The thus obtained pellets were dried at 90° C. for 3 hours, and the following evaluations were carried out.

(Transparency)

Using an injection molding machine (EC100-2A; manufactured by Toshiba Machine Co., Ltd.), the above-obtained pellets were each filled into a die at an injection temperature of 230° C. and an injection pressure of 50 to 60 MPa for 40 seconds, and cooled in the die at 40° C. for 20 seconds. Thereafter, under conditions for removal of a sheet from the die, injection molding was carried out to obtain a square sheet of 60 mm×60 mm having a thickness of 1 mm. Immediately after the injection molding, the thus obtained sheet was left to stand for not less than 48 hours in an incubator having an inner temperature of 23° C., and the transparency (Haze) of the test piece was then determined using Haze Guard II (manufactured by Toyo Seiki Seisaku-sho Ltd.). The results are shown in Table 2 below.

(Crystallization Temperature)

The thus obtained pellets were heated to 300° C. at a rate of 50° C./min using a differential scanning calorimeter (Diamond; manufactured by PerkinElmer, Inc.) and after maintaining them for 10 minutes, the pellets were cooled to 100° C. at a rate of −10° C./min to obtain charts. In the thus obtained respective charts, the endothermic peak top was regarded as the crystallization temperature. The results are shown in Table 2 below.

TABLE 2

| | Crystal Nucleating Agent | Added Amount [parts by mass] | Evaluation on Physical Properties | |
|---|---|---|---|---|
| | | | Transparency [%] | Crystallization Temperature [° C.] |
| Example B-1 | Compound B-1 | 0.1 | 39.2 | 109.3 |
| Example B-2 | Compound B-1 | 0.15 | 14.7 | 112.4 |
| Example B-3 | Compound B-1 | 0.2 | 12.9 | 112.7 |
| Example B-4 | Compound B-1 | 0.3 | 11.3 | 100.4 |
| Example B-5 | Compound B-2 | 0.3 | 21.1 | 110.3 |
| Example B-6 | Compound B-3 | 0.3 | 17.4 | 112.3 |
| Example B-7 | Compound B-7 | 0.3 | 24.4 | 100.1 |
| Example B-8 | Compound B-9 | 0.1 | 31.4 | 107.6 |
| Example B-9 | Compound B-9 | 0.2 | 23.2 | 114.7 |
| Example B-10 | Compound B-9 | 0.3 | 11.8 | 115.5 |
| Example B-11 | Compound B-9 | 0.4 | 11.3 | 115.8 |
| Example B-12 | Compound B-9 | 0.5 | 19.0 | 116.1 |
| Comparative Example B-1 | Control[1] | — | 52.9 | 96.2 |
| Comparative Example B-2 | Comparative Compound B-1[3] | 0.1 | 73.4 | 107.1 |
| Comparative Example B-3 | Comparative Compound B-2[4] | 0.1 | 79.3 | 105.0 |

TABLE 2-continued

| | Crystal Nucleating Agent | Added Amount [parts by mass] | Evaluation on Physical Properties | |
|---|---|---|---|---|
| | | | Trans- parency [%] | Crystallization Temperature [° C.] |
| Comparative Example B-4 | Comparative Compound B-3[5)] | 0.1 | 48.6 | 99.7 |
| Comparative Example B-5 | Comparative Compound B-4[6)] | 0.2 | 58.8 | 113.0 |
| Comparative Example B-6 | Comparative Compound B-5[7)] | 0.3 | 33.4 | 101.3 |

[1)]Without crystal nucleating agent
[3)]Comparative Compound B-1

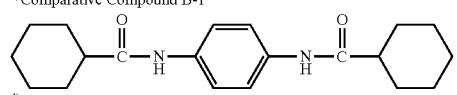

[4)]Comparative Compound B-2

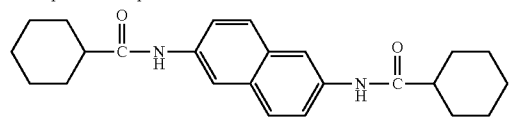

[5)]Comparative Compound B-3

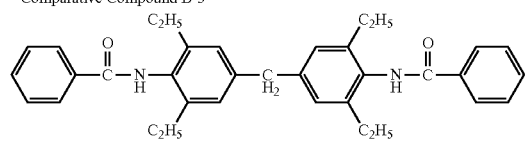

[6)]Comparative Compound B-4

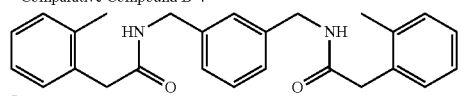

[7)]Comparative Compound B-5

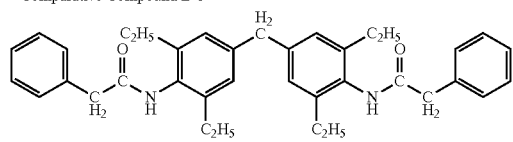

From Table 2, it is seen that the polyolefin-based resin compositions containing a compound which is not the crystal nucleating agent according to the present invention can have neither a satisfactory transparency nor a satisfactory crystallization temperature, and from Comparative Examples B-1 to B-3 and B-5, it is seen that such polyolefin-based resin compositions may rather have a deteriorated transparency. On the contrary, from Examples B-1 to B-12, the polyolefin-based resin compositions using the crystal nucleating agent represented by the Formula (2) of the present invention were confirmed to have superior transparency and crystallization temperature.

Example C

Production Example C-1

With respect to 100 parts by mass of polyolefin-based resin (ethylene/propylene random copolymer; melt flow value: 8 g/10 min at 230° C.), 0.1 parts by mass of tetrakis[methylene-3-(3',5'-di-tert-butyl-4'-hydroxyphenyl)propionate]methane as phenol-based antioxidant, 0.1 parts by mass of tris(2,4-di-tert-butylphenyl)phosphite as phosphorous-based antioxidant, 0.05 parts by mass of calcium stearate as neutralizing agent, 0.035 parts by mass of α,α'-di(t-butylperoxy)diisopropylbenzene for adjusting the fluidity of the polyolefin-based resin, and the hydrazide compound according to Tables 3 to 5 below were mixed for 1 minute using a Henschel mixer (FM200; manufactured by Mitsui Mining Co., Ltd.) at 1,000 rpm. The thus obtained mixture was granulated using a biaxial extruder (machine: PCM-30 manufactured by Ikegai Co., Ltd.; extrusion temperature: 240° C.; screw speed: 160 rpm) to obtain a pellet. It is noted here that the melt flow rate (MRF) at 230° C. of the pellet not containing a nucleating agent was measured in accordance with the measurement method of JIS K7210 to be 42 g/10 min. For the thus obtained pellets, the following evaluations were carried out.

(Transparency)

Using an injection molding machine (EC100-2A; manufactured by Toshiba Machine Co., Ltd.), injection molding of the above-obtained pellets was carried out under the following injection conditions (injection temperature: 200° C.; injection pressure: 70 to 80 MPa; time for filling the die: 40 seconds; die temperature: 40° C.; time for cooling in the die: 20 seconds) to obtain square sheets of 60 mm×60 mm each having a thickness of 0.5 mm, 1 mm or 2 mm. Immediately after the injection molding, these sheets were left to stand for not less than 48 hours in an incubator having an inner temperature of 23° C., and the transparency (Haze) of each test piece was measured using Haze Guard 2 (manufactured by Toyo Seiki Seisaku-sho Ltd.). A smaller value indicates a better transparency of the test piece. The results are shown in Tables 3 to 5 below.

TABLE 3

| | Compound Name | Added Amount [parts by mass] | Transparency (Haze) |
|---|---|---|---|
| Thickness of Test Piece | | 0.5 mm | |
| Example C-1-1 | Compound C-1 | 0.1 | 13 |
| Example C-1-2 | Compound C-1 | 0.2 | 7.4 |
| Example C-1-3 | Compound C-1 | 0.3 | 4.9 |
| Comparative Example C-1-1 | Control[1)] | 0 | 22.1 |
| Comparative Example C-1-2 | Comparative Compound C-1[8)] | 0.3 | 6.1 |

[1)]Without crystal nucleating agent
[8)]Comparative Compound C-1 1,3:2,4-bis(3,4-dimethylbenzylidene)sorbitol

TABLE 4

| | Compound Name | Added Amount [parts by mass] | Transparency (Haze) |
|---|---|---|---|
| Thickness of Test Piece | | 1 mm | |
| Example C-2-1 | Compound C-1 | 0.2 | 21.3 |
| Example C-2-2 | Compound C-2 | 0.2 | 55.3 |
| Example C-2-3 | Compound C-3 | 0.2 | 44.1 |
| Example C-2-4 | Compound C-4 | 0.2 | 49.3 |
| Example C-2-5 | Compound C-5 | 0.2 | 43.6 |
| Example C-2-6 | Compound C-5 | 0.3 | 46.1 |
| Example C-2-7 | Compound C-8 | 0.1 | 48.0 |
| Comparative Example C-2-1 | Control[1)] | 0 | 70 |
| Comparative Example C-2-2 | Comparative Compound C-2[9)] | 0.2 | 71.2 |
| Comparative Example C-2-3 | Comparative Compound C-3[10)] | 0.2 | 81.1 |
| Comparative Example C-2-4 | Comparative Compound C-4[11)] | 0.2 | 71.5 |
| Comparative Example C-2-5 | Comparative Compound C-5[12)] | 0.2 | 74.8 |
| Comparative Example C-2-6 | Comparative Compound C-6[13)] | 0.2 | 69.5 |

TABLE 4-continued

| | Compound Name | Added Amount [parts by mass] | Transparency (Haze) |
|---|---|---|---|
| Comparative Example C-2-7 | Comparative Compound C-7[14) | 0.2 | 72.1 |

[9)]Comparative Compound C-2

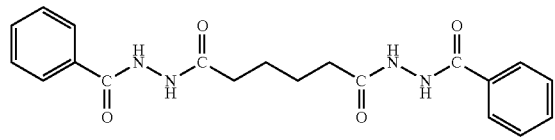

[10)]Comparative Compound C-3

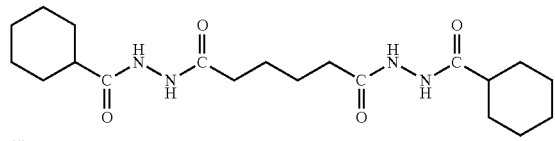

[11)]Comparative Compound C-4

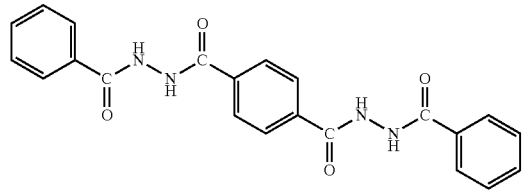

[12)]Comparative Compound C-5

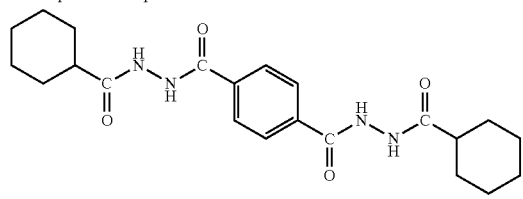

[13)]Comparative Compound C-6

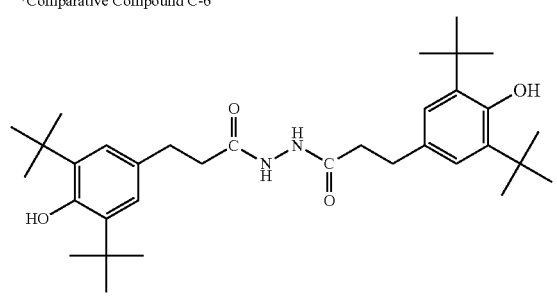

[14)]Comparative Compound C-7

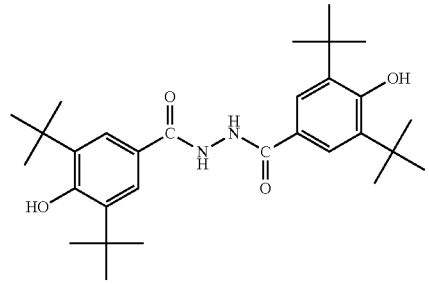

TABLE 5

| | Compound Name | Added Amount [parts by mass] | Transparency (Haze) |
|---|---|---|---|
| Thickness of Test Piece | | 2 mm | |
| Example C-3-1 | Compound C-1 | 0.1 | 63.9 |

TABLE 5-continued

| | Compound Name | Added Amount [parts by mass] | Transparency (Haze) |
|---|---|---|---|
| Example C-3-2 | Compound C-1 | 0.2 | 56.1 |
| Comparative Example C-3-1 | Control[1)] | 0 | 74 |

From the comparison between Example C-1-3 and Comparative Example C-1-2 in the above Table 3, it was confirmed that, in cases where the same amount of nucleating agent was used, the molded articles of the polyolefin-based resin composition had better transparency when added with the crystal nucleating agent represented by the Formula (3) of the present invention than when added with commercially available nucleating agent.

In addition, from the data of Comparative Example C-2-1 and Comparative Examples C-2-2 to C-2-7 shown in the above Table 4, it was revealed that, when a hydrazide compound which is not the specific hydrazide compound represented by the Formula (3) of the present invention was added, the transparency of the molded articles of the polyolefin-based resin composition was not improved and rather deteriorated. In contrast to this, from the comparison between Examples C-2-1 to C-2-7 and Comparative Example C-2-1, it was confirmed that the addition of the crystal nucleating agent represented by the Formula (3) of the present invention resulted in an improvement in the transparency of the molded articles of the polyolefin-based resin composition. Furthermore, from the above Table 5, it was confirmed that the molded articles of the polyolefin-based resin composition according to the present invention had superior transparency even when the test pieces had a greater thickness.

Production Example C-2

Test pieces having a thickness of 1 mm were prepared in the same manner as in the aforementioned Production Example C-1 except that 0.2 parts by mass of 1,2-dicyclohexylcarbonyl hydrazide (Compound C-1) was used in place of the hydrazide compound and that the neutralizing agents shown in Table 6 below were used in place of 0.05 parts by mass of calcium stearate, and the transparency (Haze) of the test pieces was determined. The results are shown in Table 6 below.

TABLE 6

| | Neutralizing Agent | Added Amount [parts by mass] | Transparency (Haze) |
|---|---|---|---|
| Example C-4-1 | Calcium stearate | 0.05 | 21.6 |
| Example C-4-2 | Sodium stearate | 0.05 | 14.2 |
| Example C-4-3 | Lithium stearate | 0.01 | 19.7 |
| Example C-4-4 | Ethylenebis-stearoamide | 0.05 | 22.1 |
| Example C-4-5 | Ethylenebis (12-hydroxystearoamide) | 0.05 | 17.3 |
| Example C-4-6 | Stearic acid amide | 0.05 | 23.0 |
| Comparative Example C-4-1 | Control[15)] | 0 | 25.5 |

[15)]Without neutralizing agent

From Examples C-4-1 to C-4-6 in Table 6, it was confirmed that the addition of neutralizing agent comprising a fatty acid metal salt or a fatty acid amide compound resulted in a further improvement in the transparency of the molded articles of the polyolefin-based resin composition according to the present invention.

Examples D and E

Production Examples D-1 and E-1

With respect to 100 parts by mass of polyolefin-based resin (ethylene/propylene random copolymer; melt flow rate: 8 g/10 min), 0.1 parts by mass of phenol-based antioxidant (tetrakis[methylene-3-(3',5'-di-tert-butyl-4'-hydroxyphenyl) propionate]methane), 0.1 parts by mass of phosphorous-based antioxidant (tris(2,4-di-tert-butylphenyl)phosphite), 0.05 parts by mass of polymerization catalyst inactivator (neutralizing agent: calcium stearate), 0.035 parts by mass of polyolefin-based resin molecular weight modifier (α,α'-di(t-butylperoxy)diisopropylbenzene) and 0.3 parts by mass of the crystal nucleating agent shown in Table 7 below were mixed for 1 minute using a Henschel mixer (FM200; manufactured by Mitsui Mining Co., Ltd.) at 1,000 rpm. The thus obtained mixture was granulated using a uniaxial extruder (machine: Plastomill μ manufactured by Toyo Seiki Seisaku-sho Ltd.; extrusion temperature: 230° C.; screw rotational speed: 50 rpm) to obtain a pellet. The thus obtained pellets were dried at 60° C. for 5 hours, and the following evaluations were carried out. The compounds shown in Table 7 each corresponds to the aforementioned compounds. It is noted here that the pellet to which the nucleating agent was not blended had a melt flow rate of 42 g/10 min at 230° C.

(Crystallization Temperature)

The crystallization temperature of the thus obtained pellets was measured using a differential scanning calorimeter (Diamond; manufactured by PerkinElmer, Inc.). For the measurements, the thus obtained pellets were heated to 230° C. at a rate of 50° C./min and after maintaining them for 10 minutes, the pellets were cooled to 50° C. at a rate of −10° C./min to obtain charts. In the thus obtained respective charts, the exothermic was regarded as the crystallization temperature. The results are shown in Table 7 below.

(Half Crystallization Time)

Using a differential scanning calorimeter (Diamond; manufactured by PerkinElmer, Inc.), the thus obtained pellets were heated to 230° C. at a rate of 200° C./min and after maintaining them for 5 minutes, the pellets were cooled to 110° C. at a rate of −200° C./min and maintained for 20 minutes as they were. Considering the time point at which the temperature reached 110° C. as the start time, the time required for the calorie (ΔHc) necessary for the endothermic reaction in the crystallization of the polypropylene-based resin composition to become half was determined as half crystallization time (t ½). The results are shown in Table 7 below.

TABLE 7

| Crystal Nucleating Agent | | Crystallization Temperature Tc [° C.] | Half Crystallization Time $t_{1/2}$ [min] |
|---|---|---|---|
| Example D-1 | Compound D-1 | 105.1 | 1.4 |
| Example D-2 | Compound D-2 | 106.0 | 0.9 |
| Example D-3 | Compound D-3 | 105.5 | 1.1 |
| Example D-4 | Compound D-4 | 105.6 | 1.0 |
| Example E-1 | Compound E-5 | 103.7 | 1.5 |
| Example E-2 | Compound E-6 | 104.7 | 1.1 |
| Example E-3 | Compound E-7 | 104.4 | 1.3 |
| Comparative Example D-1 | Control[1] | 101.7 | 2.0 |
| Comparative Example D-2 | Comparative Compound D-1[16] | 101.9 | 1.9 |

[1] Without crystal nucleating agent
[16] Cyclohexylcarbonyl benzaldehyde hydrazone

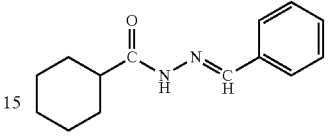

Production Example D-2

With respect to 100 parts by mass of polyolefin-based resin (ethylene/propylene random copolymer; melt flow rate: 8 g/10 min), 0.1 parts by mass of phenol-based antioxidant (tetrakis[methylene-3-(3',5'-di-tert-butyl-4'-hydroxyphenyl) propionate]methane), 0.1 parts by mass of phosphorous-based antioxidant (tris(2,4-di-tert-butylphenyl)phosphite), 0.05 parts by mass of polymerization catalyst inactivator (neutralizing agent: calcium stearate), 0.035 parts by mass of polyolefin-based resin molecular weight modifier (α,α'-di(t-butylperoxy)diisopropylbenzene) and the Compound D-2 at an amount shown in Table 8 below were mixed. The thus obtained mixture was granulated using a uniaxial extruder (machine: Plastomill μ manufactured by Toyo Seiki Seisaku-sho Ltd.; extrusion temperature: 230° C.; screw rotational speed: 50 rpm) to obtain a pellet. The thus obtained pellets were dried at 60° C. for 5 hours, and the aforementioned evaluations were carried out. It is noted here that the pellet to which the nucleating agent was not blended had a melt flow rate of 42 g/10 min at 230° C.

TABLE 8

| | Crystal Nucleating Agent | Added Amount [ppm] | Crystallization Temperature Tc[° C.] | Half Crystallization Time $t_{1/2}$ [min] |
|---|---|---|---|---|
| Example D-5 | Compound D-2 | 0.05 | 104.9 | 1.2 |
| Example D-6 | Compound D-2 | 0.1 | 105.1 | 1.4 |
| Example D-7 | Compound D-2 | 0.2 | 104.7 | 1.1 |
| Example D-8 | Compound D-2 | 0.3 | 106.0 | 0.9 |
| Comparative Example D-1 | Control[1] | — | 101.7 | 2.0 |

According to the results of Comparative Example D-2 shown in the above Table 7, the polyolefin-based resin compositions using a hydrazone compound whose structure is not represented by the Formula (4) or (5) of the present invention had a low crystallization temperature of the polyolefin-based resin, and since the compositions had a long crystallization time, the crystallization rate was not satisfactory.

In contrast to this, according to the results of Examples D-1 to D-4 and E-1 to E-3 in the above Table 7, the polyolefin-based resin compositions using the specific crystal nucleating agent according to the present invention had a higher crystallization temperature and a shorter crystallization time compared to Comparative Example D-1. From this, it was confirmed that crystallization was facilitated in the polyolefin-based resin composition according to the present invention compared to those resin compositions to which no crystal nucleating agent was blended or a hydrazone compound which is not represented by the Formula (4) or (5) was blended.

In addition, from Examples D-5 to D-8 shown in the above Table 8, it was confirmed that the polyolefin-based resin compositions containing a hydrazone compound at an amount of 0.05 to 0.3 parts by mass with respect to 100 parts by mass of the polyolefin-based resin exhibited sufficient crystallization promoting effect. Furthermore, for those pellets of the polyolefin-based resin composition that were prepared in the same manner as in Examples D-5 to D-8 except that 3 parts of the Compound D-2 was blended, cloudiness was observed.

From the above, it was confirmed that the polyolefin-based resin composition according to the present invention exhibited superior crystallization promoting effect by utilizing the specific crystal nucleating agent.

Example F

Production Example F-1

Using a Henschel mixer, 100 parts by mass of polypropylene (PP) resin (random PP, MFR=42 g/10 min), 0.1 parts by mass of tetrakis((3,5-di-t-butyl-4-hydroxyphenyl)propionyloxymethyl)methane, 0.1 parts by mass of tris(2,4-di-t-butylphenyl)phosphite, 0.05 parts by mass of calcium stearate and the Components (a) to (d) or Comparative Compound as shown in Table 9 below were added (in Tables 9 to 11, the unit of the added amount is parts by mass) and mixed for 5 minutes. The resulting mixture was extruded at 250° C., and injection molding was carried out at 230° C. to prepare test pieces of Examples F-1-1 to F-1-10 having a thickness of 0.5 mm or 1 mm. The transparency of the test pieces was evaluated in terms of the Haze value (JIS K7105). The results are also shown in Table 9.

Test pieces of Comparative Examples F-1-1 to F-1-3 were prepared and their transparency was evaluated under the same conditions for preparation of test pieces as in the aforementioned Example F-1-1 except that the formulations according to Table 10 below were used in place of the formulations according to Table 9. The results are also shown in Table 10.

TABLE 10

|  |  | | Comparative Example | | |
|---|---|---|---|---|---|
|  |  |  | F-1-1 | F-1-2 | F-1-3 |
| Component (a) | Comparative Compound F-1[17)] | | 0.03 | — | — |
|  | Comparative Compound F-2[18)] | | — | 0.03 | — |
| Evaluation | Haze Value | (0.5 mm) | 21.0 | 21.4 | 21.8 |
|  |  | (1.0 mm) | 68.5 | 70.2 | 73.8 |

[17)]Comparative Compound F-1

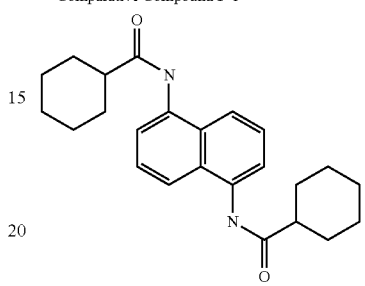

[18)]Comparative Compound F-2

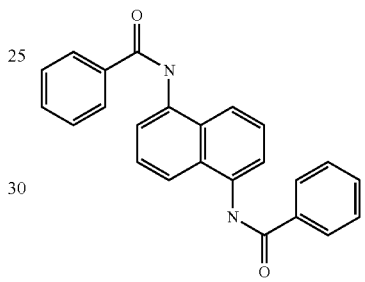

Production Example F-2

Test pieces of Examples F-2-1 to F-2-4 and Comparative Examples F-2-1 to F-2-4 were prepared and their transparency was evaluated under the same conditions as in the aforementioned Example F-1-1 except that a polypropylene resin having a MFR of 10 g/10 min was used in place of the polypropylene resin of Example F-1-1 and that the formulations shown in Table 11 below were used in place of those shown in Table 9. The results are also shown in Table 11.

TABLE 9

|  |  | Example | | | | | | | | | |
|---|---|---|---|---|---|---|---|---|---|---|---|
|  |  | F-1-1 | F-1-2 | F-1-3 | F-1-4 | F-1-5 | F-1-6 | F-1-7 | F-1-8 | F-1-9 | F-1-10 |
| Component (a) | Compound F-1 | 0.03 | — | — | — | — | — | — | — | — | — |
|  | Compound F-2 | — | 0.015 | 0.03 | 0.06 | 1.0 | — | 0.03 | 0.03 | 0.03 | 0.03 |
|  | Compound F-4 | — | — | — | — | — | 0.3 | — | — | — | — |
|  | Compound F-6 | — | — | — | — | — | — | 0.3 | — | — | — |
| Component (b) | Compound G-5 | — | — | — | — | — | — | — | 0.018 | — | — |
| Component (c) | Lithium myristate | — | — | — | — | — | — | — | 0.012 | — | — |
| Component (d) | Compound H-5 | — | — | — | — | — | — | — | — | 0.01 | — |
|  | Compound H-14 | — | — | — | — | — | — | — | — | — | 0.02 |
| Evaluation | Haze Value (0.5 mm) | 9.0 | 8.7 | 7.2 | 10.2 | 20.1 | 6.7 | 7.2 | 6.1 | 6.9 | 7.1 |
|  | (1.0 mm) | 35.9 | 28.5 | 30.1 | 35.0 | 62.3 | 27.5 | 27.7 | 22.7 | 26.1 | 26.7 |

TABLE 11

| | | Example | | | | Comparative Example | | | |
|---|---|---|---|---|---|---|---|---|---|
| | | F-2-1 | F-2-2 | F-2-3 | F-2-4 | F-2-1 | F-2-2 | F-2-3 | F-2-4 |
| Component (a) | Compound F-3 | 0.2 | — | — | — | — | — | — | — |
| | Compound F-4 | — | 0.01 | 0.05 | 0.2 | — | — | — | — |
| | Comparative Compound F-1[17)] | — | — | — | — | 0.2 | — | — | — |
| | Comparative Compound F-2[18)] | — | — | — | — | — | 0.05 | 0.2 | — |
| Evaluation | Haze (0.5 mm) Value | 27.3 | 23.6 | 19.4 | 26.7 | 60.5 | 57.9 | 83.5 | 48.5 |

As evident from the comparison between the results of Examples F-1-1 to F-1-10 and Examples F-2-1 to F-2-4 and those of Comparative Examples F-1-1 to F-1-3 and F-2-1 to F-2-4 that are shown in the above Tables 9 to 11, it is seen that those resin molded articles of the polyolefin-based resin compositions to which the crystal nucleating agent having a structure represented by the Formula (6) of the present invention was blended had superior transparency. Not only that the prominent effect of allowing the resin molded articles to have superior transparency was confirmed also in single blend system of the Component (a) as in Examples F-1-1 to F-1-6, but also multiple blend system of the Components (b) to (d) in Examples F-1-7 to F-1-10 exhibited the prominent effect on the transparency of the resin molded articles. In particular, comparing Example F-1-3 with Examples F-1-8 to F-1-10, it is seen that the resin molded articles in which the Components (b) to (d) were used in combination with the Component (a) according to the present invention exhibited prominent synergistic effect. In addition, from the results shown in Table 11, it was confirmed that those resins having a small MFR exhibited even more prominent transparency-improving effect.

The invention claimed is:

1. A polyolefin-based resin composition, characterized by comprising, with respect to 100 parts by mass of a polyolefin-based resin, 0.01 to 1 parts by mass of at least one crystal nucleating agent selected from the group consisting of:

a crystal nucleating agent (A) having a structure in which at least 4 carbamate groups represented by the following Formula (1) are linked via a $C_1$-$C_{10}$ hydrocarbon group:

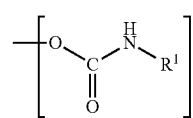

(1)

wherein, $R^1$ represents a hydrogen atom, a $C_1$-$C_{12}$ alkyl group which is optionally branched, a $C_3$-$C_{12}$ cycloalkyl group which is optionally substituted or a $C_6$-$C_{18}$ aryl group which is optionally substituted; and the plural $R^1$s are each optionally different;

a crystal nucleating agent (B) represented by the following Formula (2):

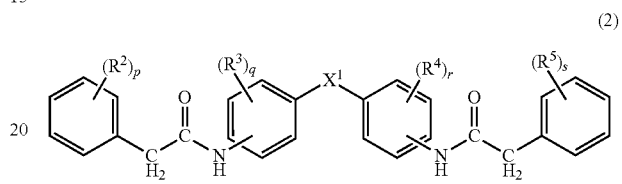

(2)

wherein, $X^1$ is a $C_1$-$C_5$ alkylene group which is optionally branched; $R^2$ to $R^5$ independently represent one selected from the group consisting of a halogen atom, a $C_1$-$C_4$ alkyl group which is optionally substituted and/or is optionally branched and a $C_1$-$C_4$ alkoxy group which is optionally substituted and/or is optionally branched; and p, q, r and s independently represent an integer of 0 to 3 (provided that p and s are not 0);

a crystal nucleating agent (C) represented by the following Formula (3):

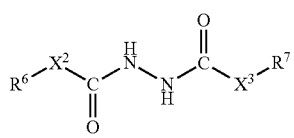

(3)

wherein, $R^6$ and $R^7$ independently represent a $C_3$-$C_{12}$ cycloalkyl group which is optionally substituted; and $X^2$ and $X^3$ independently represent a single bond or a $C_1$-$C_5$ alkylene group; provided that the substituent(s) is/are not a hydroxyl group;

a crystal nucleating agent (D) represented by the following Formula (4):

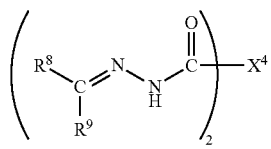

(4)

wherein, $R^8$ and $R^9$ independently represent a hydrogen atom, a $C_1$-$C_{12}$ alkyl group which is optionally branched and/or is optionally substituted, a $C_3$-$C_{12}$ cycloalkyl group which is optionally substituted or a $C_6$-$C_{18}$ aryl group which is optionally substituted; $R^8$ and $R^9$ optionally form a $C_6$-$C_{18}$ ring with a carbon atom at a terminal of the hydrazone structure; and $X^4$ represents a $C_1$-$C_{10}$ alkylene group which is optionally branched and/or is optionally substituted, a $C_3$-$C_{12}$ cycloalkylene group which is optionally substituted or a $C_6$-$C_{20}$ arylene group which is optionally substituted;

a crystal nucleating agent (E) represented by the following Formula (5):

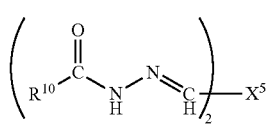

(5)

wherein, $R^{10}$ represents a hydrogen atom, a $C_1$-$C_{12}$ alkyl group which is optionally branched and/or is optionally substituted, a $C_3$-$C_{12}$ cycloalkyl group which is optionally substituted or a $C_6$-$C_{18}$ aryl group which is optionally substituted; and $X^5$ represents a $C_1$-$C_{10}$ alkylene group which is optionally branched and/or is optionally substituted, a $C_3$-$C_{12}$ cycloalkylene group which is optionally substituted or a $C_6$-$C_{20}$ arylene group which is optionally substituted; and a crystal nucleating agent (F) represented by the following Formula (13):

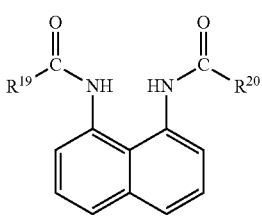

(13)

wherein, $R_{19}$ and $R^{20}$ independently represent a $C_1$-$C_{12}$ alkyl group which is optionally branched.

2. The polyolefin-based resin composition according to claim 1, wherein said crystal nucleating agent (A) having a structure in which at least 4 carbamate groups represented by said Formula (1) are linked via a $C_1$-$C_{10}$ hydrocarbon group is one which is represented by the following Formula (7):

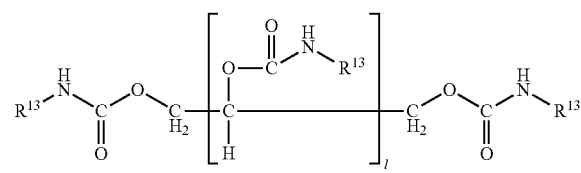

(7)

wherein, $R^{13}$ has the same definition as said $R^1$ in said Formula (1); l represents an integer of 2 to 10; and the plural $R^{13}$s are each optionally different; or one which is represented by the following Formula (8):

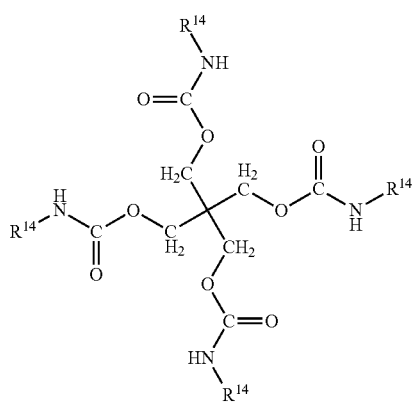

(8)

wherein, $R^{14}$ has the same definition as said $R^1$ in said Formula (1); and the plural $R^{14}$s are each optionally different.

3. The polyolefin-based resin composition according to claim 1, wherein, in said Formula (2) representing said crystal nucleating agent (B), said $R^2$ and $R^5$ are at an ortho position of the benzene ring; and/or said p and s represent 1 and said q and r are 2.

4. The polyolefin-based resin composition according to claim 1, wherein said crystal nucleating agent (C) represented by said Formula (3) is at least one selected from the group consisting of crystal nucleating agents represented by the following Formulae (9) to (11):

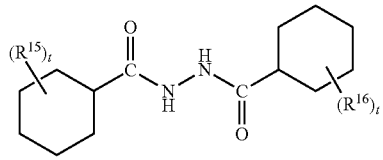

(9)

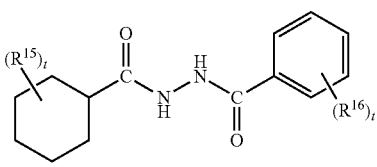

(10)

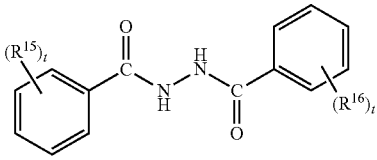

(11)

wherein, $R^{15}$ and $R^{16}$ independently have the same definition as said $R^6$ in said Formula (3); and t represents 0 or 1.

5. The polyolefin-based resin composition according to claim 1, wherein said $X^4$ in said Formula (4) representing said crystal nucleating agent (D) is a 1,4-cyclohexylene group; or said $X^5$ in said Formula (5) representing said crystal nucleating agent (E) is a 1,4-phenylene group.

6. The polyolefin-based resin composition according to claim 1, wherein said polyolefin-based resin composition further comprises, with respect to 100 parts by mass of said polyolefin-based resin, one or more selected from the group consisting of:

0.001 to 5 parts by mass of cyclic organic phosphoric acid ester metal salt compound represented by the following Formula (14):

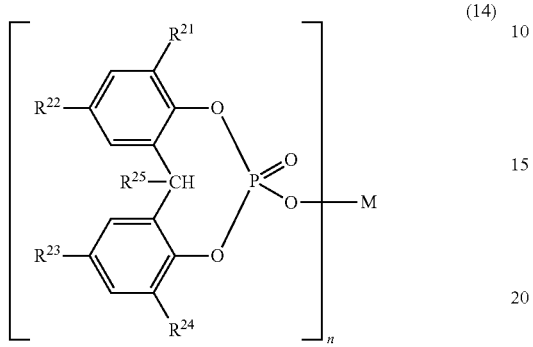

wherein, $R^{21}$ to $R^{24}$ independently represent a hydrogen atom or a $C_1$-$C_9$ alkyl group which is optionally branched; $R^{25}$ represents a hydrogen atom or a methyl group; n represents 1 or 2; M represents an alkali metal when n is 1; and when n is 2, M represents Al(OH);

0.001 to 5 parts by mass of carboxylic acid alkali metal salt; and 0.001 to 5 parts by mass of diamide compound represented by the following Formula (15):

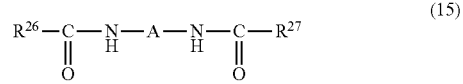

wherein, $R^{26}$ and $R^{27}$ independently represent a hydrogen atom, a $C_1$-$C_{21}$ alkyl group which is optionally branched and/or is optionally substituted, a $C_3$-$C_{12}$ cycloalkyl group which is optionally substituted, a $C_6$-$C_{20}$ aryl group which is optionally substituted or a $C_6$-$C_{20}$ arylalkyl group which is optionally branched and/or is optionally substituted; and A represents a group represented by the following Formula (16):

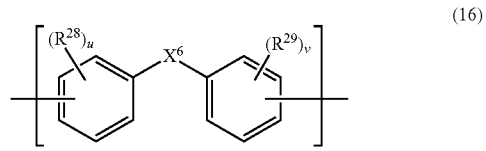

wherein, $X^6$ represents a $C_1$-$C_5$ alkylene group which is optionally branched; $R^{28}$ and $R^{29}$ independently represent a halogen atom, a $C_1$-$C_4$ alkyl group which is optionally branched and/or is optionally substituted or a $C_1$-$C_4$ alkoxy group which is optionally branched and/or is optionally substituted; and u and v independently represent an integer of 0 to 4 or a group represented by the following Formula (17):

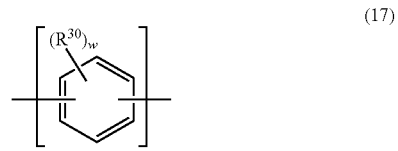

wherein, $R^{30}$ represents a halogen atom, a $C_1$-$C_4$ alkyl group which is optionally branched and/or is optionally substituted or a $C_1$-$C_4$ alkoxy group which is optionally branched and/or is optionally substituted; and w represents an integer of 0 to 4.

7. The polyolefin-based resin composition according to claim 6, wherein, in said Formula (14), said $R^{21}$ to $R^{24}$ are a tert-butyl group and said $R^{25}$ is a hydrogen atom.

8. The polyolefin-based resin composition according to claim 1, wherein a fatty acid metal salt or a fatty acid amide compound is further added at an amount of 0.01 to 1 parts by mass with respect to 100 parts by mass of said polyolefin-based resin.

9. The polyolefin-based resin composition according to claim 8, wherein said fatty acid metal salt or fatty acid amide compound is selected from the group consisting of lithium stearate, calcium stearate, sodium stearate, ethylenebisstearoamide, ethylenebis(12-hydroxystearoamide) and stearic acid amide.

10. The polyolefin-based resin composition according to claim 1, wherein said polyolefin-based resin is a polypropylene-based resin.

* * * * *